United States Patent
Stimm et al.

(10) Patent No.: US 12,262,115 B2
(45) Date of Patent: Mar. 25, 2025

(54) METHODS AND APPARATUS FOR ELECTRONIC IMAGE STABILIZATION BASED ON A LENS POLYNOMIAL

(71) Applicant: GoPro, Inc., San Mateo, CA (US)

(72) Inventors: Daryl Stimm, Encinitas, CA (US); Kyler William Schwartz, Oceanside, CA (US); Andrew Russell, San Francisco, CA (US); Robert McIntosh, Marina Del Rey, CA (US)

(73) Assignee: GoPro, Inc., San Mateo, CA (US)

( * ) Notice: Subject to any disclaimer, the term of this patent is extended or adjusted under 35 U.S.C. 154(b) by 123 days.

(21) Appl. No.: 17/804,661

(22) Filed: May 31, 2022

(65) Prior Publication Data

US 2023/0247292 A1    Aug. 3, 2023

Related U.S. Application Data

(60) Provisional application No. 63/267,289, filed on Jan. 28, 2022.

(51) Int. Cl.
*H04N 23/68*    (2023.01)
*H04N 23/45*    (2023.01)
*H04N 23/698*    (2023.01)

(52) U.S. Cl.
CPC ........... *H04N 23/683* (2023.01); *H04N 23/45* (2023.01); *H04N 23/6811* (2023.01); *H04N 23/6812* (2023.01); *H04N 23/698* (2023.01)

(58) Field of Classification Search
CPC .. H04N 23/683; H04N 23/6812; H04N 23/45; H04N 23/6811; H04N 23/698
See application file for complete search history.

(56) References Cited

U.S. PATENT DOCUMENTS

| | | |
|---|---|---|
| 5,130,794 A | 7/1992 | Ritchey |
| 6,323,934 B1 | 11/2001 | Enomoto |
| 6,337,683 B1 | 1/2002 | Gilbert |
| 6,593,956 B1 | 7/2003 | Potts |
| 7,222,356 B1 | 5/2007 | Yonezawa |
| 7,483,618 B1 | 1/2009 | Edwards |

(Continued)

FOREIGN PATENT DOCUMENTS

| | | |
|---|---|---|
| EP | 1515548 A2 | 3/2005 |
| WO | 2001020466 | 3/2001 |

(Continued)

*Primary Examiner* — James T Boylan
(74) *Attorney, Agent, or Firm* — Wang Hardoon, P.C.

(57) ABSTRACT

Methods and apparatus for stabilizing image data based on a lens polynomial. Non-rectilinear footage can be captured and rectified in-camera; the rectified images may be stabilized to provide rectified stable video. In one exemplary embodiment, the footage is rectified and stabilized based on a lens polynomial and the camera's own movement. In some variants, the rectified stable video may be stored along with its margin track. In-camera rectified stable video provides several benefits over traditional techniques (e.g., the ability to share rectilinear content from the camera without additional post-processing, as well as reduced file sizes of the shared videos). Lens-aware post-processing can reuse portions of the in-camera rectified stable videos while providing additional benefits (e.g., the ability to re-frame the video in post-production).

20 Claims, 12 Drawing Sheets

(56) References Cited

U.S. PATENT DOCUMENTS

| | | |
|---|---|---|
| 7,593,635 B2 | 9/2009 | Jeon |
| 7,893,985 B1 | 2/2011 | Ahiska |
| 7,912,317 B2 | 3/2011 | Souchard |
| 8,274,548 B2 | 9/2012 | Fujita |
| 8,416,266 B2 | 4/2013 | Shoemaker |
| 8,427,538 B2 | 4/2013 | Ahiska |
| 8,446,433 B1 | 5/2013 | Mallet |
| 8,466,969 B2 | 6/2013 | Goto |
| 8,611,422 B1 | 12/2013 | Yagnik |
| 8,718,447 B2 | 5/2014 | Yang |
| 8,730,299 B1 | 5/2014 | Kozko |
| 8,763,023 B1 | 6/2014 | Goetz |
| 8,860,816 B2 | 10/2014 | Corcoran |
| 8,910,046 B2 | 12/2014 | Matsuda |
| 8,988,509 B1 | 3/2015 | Macmillan |
| 9,032,299 B2 | 5/2015 | Lyons |
| 9,036,001 B2 | 5/2015 | Chuang |
| 9,077,956 B1 | 7/2015 | Morgan |
| 9,105,080 B2 | 8/2015 | Mcandrew |
| 9,111,579 B2 | 8/2015 | Meaney |
| 9,142,253 B2 | 9/2015 | Ubillos |
| 9,151,933 B2 | 10/2015 | Sato |
| 9,204,039 B2 | 12/2015 | He |
| 9,208,821 B2 | 12/2015 | Evans |
| 9,245,582 B2 | 1/2016 | Shore |
| 9,253,533 B1 | 2/2016 | Morgan |
| 9,262,807 B2 | 2/2016 | Stec |
| 9,317,172 B2 | 4/2016 | Lyons |
| 9,423,944 B2 | 8/2016 | Eppolito |
| 9,473,758 B1 | 10/2016 | Long |
| 9,479,697 B2 | 10/2016 | Aguilar |
| 9,564,173 B2 | 2/2017 | Swenson |
| 9,681,111 B1 | 6/2017 | Newman |
| 9,754,347 B2 * | 9/2017 | Sartor ................ G02B 27/0101 |
| 10,186,012 B2 | 1/2019 | Newman |
| 10,395,338 B2 | 8/2019 | Newman |
| 10,529,051 B2 | 1/2020 | Newman |
| 10,529,052 B2 | 1/2020 | Newman |
| 10,535,115 B2 | 1/2020 | Newman |
| 10,679,323 B2 | 6/2020 | Newman |
| 10,817,977 B2 | 10/2020 | Newman |
| 11,164,282 B2 | 11/2021 | Newman |
| 11,688,034 B2 | 6/2023 | Newman |
| 2002/0044153 A1 | 4/2002 | Hoch |
| 2004/0128317 A1 | 7/2004 | Sull |
| 2005/0025454 A1 | 2/2005 | Nakamura |
| 2006/0122842 A1 | 6/2006 | Herberger |
| 2007/0173296 A1 | 7/2007 | Hara |
| 2007/0204310 A1 | 8/2007 | Hua |
| 2007/0229665 A1 | 10/2007 | Tobiason |
| 2007/0230461 A1 | 10/2007 | Singh |
| 2007/0258707 A1 | 11/2007 | Raskar |
| 2008/0044155 A1 | 2/2008 | Kuspa |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0208791 A1 | 8/2008 | Das |
| 2008/0253685 A1 | 10/2008 | Kuranov |
| 2008/0253735 A1 | 10/2008 | Kuspa |
| 2008/0313541 A1 | 12/2008 | Shafton |
| 2009/0213270 A1 | 8/2009 | Ismert |
| 2009/0274339 A9 | 11/2009 | Cohen |
| 2009/0327856 A1 | 12/2009 | Mouilleseaux |
| 2010/0045773 A1 | 2/2010 | Ritchey |
| 2010/0064219 A1 | 3/2010 | Gabrisko |
| 2010/0086216 A1 | 4/2010 | Lee |
| 2010/0104261 A1 | 4/2010 | Liu |
| 2010/0183280 A1 | 7/2010 | Beauregard |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0278504 A1 | 11/2010 | Lyons |
| 2010/0278509 A1 | 11/2010 | Nagano |
| 2010/0281375 A1 | 11/2010 | Pendergast |
| 2010/0281386 A1 | 11/2010 | Lyons |
| 2010/0287476 A1 | 11/2010 | Sakai |
| 2010/0299630 A1 | 11/2010 | Mccutchen |
| 2010/0318660 A1 | 12/2010 | Balsubramanian |
| 2010/0321471 A1 | 12/2010 | Casolara |
| 2011/0025847 A1 | 2/2011 | Park |
| 2011/0069148 A1 | 3/2011 | Jones |
| 2011/0069189 A1 | 3/2011 | Venkataraman |
| 2011/0075990 A1 | 3/2011 | Eyer |
| 2011/0093798 A1 | 4/2011 | Shahraray |
| 2011/0109774 A1 | 5/2011 | Onomura |
| 2011/0134240 A1 | 6/2011 | Anderson |
| 2011/0173565 A1 | 7/2011 | Ofek |
| 2011/0206351 A1 | 8/2011 | Givoly |
| 2011/0211040 A1 | 9/2011 | Lindemann |
| 2011/0249153 A1 | 10/2011 | Hirooka |
| 2011/0258049 A1 | 10/2011 | Ramer |
| 2011/0293250 A1 | 12/2011 | Deever |
| 2011/0320322 A1 | 12/2011 | Roslak |
| 2012/0014673 A1 | 1/2012 | O'Dwyer |
| 2012/0027381 A1 | 2/2012 | Kataoka |
| 2012/0030029 A1 | 2/2012 | Flinn |
| 2012/0057852 A1 | 3/2012 | Devleeschouwer |
| 2012/0123780 A1 | 5/2012 | Gao |
| 2012/0127169 A1 | 5/2012 | Barcay |
| 2012/0206565 A1 | 8/2012 | Jason |
| 2012/0311448 A1 | 12/2012 | Achour |
| 2013/0024805 A1 | 1/2013 | In |
| 2013/0044108 A1 | 2/2013 | Tanaka |
| 2013/0044258 A1 | 2/2013 | Dennis |
| 2013/0058532 A1 | 3/2013 | White |
| 2013/0063561 A1 | 3/2013 | Stephan |
| 2013/0078990 A1 | 3/2013 | Kim |
| 2013/0127636 A1 | 5/2013 | Aryanpur |
| 2013/0136193 A1 | 5/2013 | Hwang |
| 2013/0142384 A1 | 6/2013 | Ofek |
| 2013/0151970 A1 | 6/2013 | Achour |
| 2013/0166303 A1 | 6/2013 | Chang |
| 2013/0191743 A1 | 7/2013 | Reid |
| 2013/0195429 A1 | 8/2013 | Fay |
| 2013/0197967 A1 | 8/2013 | Pinto |
| 2013/0208134 A1 | 8/2013 | Hamalainen |
| 2013/0208942 A1 | 8/2013 | Davis |
| 2013/0215220 A1 | 8/2013 | Wang |
| 2013/0259399 A1 | 10/2013 | Ho |
| 2013/0263002 A1 | 10/2013 | Park |
| 2013/0283301 A1 | 10/2013 | Avedissian |
| 2013/0287214 A1 | 10/2013 | Resch |
| 2013/0287304 A1 | 10/2013 | Kimura |
| 2013/0300939 A1 | 11/2013 | Chou |
| 2013/0308921 A1 | 11/2013 | Budzinski |
| 2013/0318443 A1 | 11/2013 | Bachman |
| 2013/0343727 A1 | 12/2013 | Rav-Acha |
| 2014/0003706 A1 | 1/2014 | Davidson |
| 2014/0026156 A1 | 1/2014 | Deephanphongs |
| 2014/0064706 A1 | 3/2014 | Lewis, II |
| 2014/0072285 A1 | 3/2014 | Shynar |
| 2014/0093164 A1 | 4/2014 | Noorkami |
| 2014/0096002 A1 | 4/2014 | Dey |
| 2014/0105573 A1 | 4/2014 | Hanckmann |
| 2014/0161351 A1 | 6/2014 | Yagnik |
| 2014/0165119 A1 | 6/2014 | Liu |
| 2014/0169766 A1 | 6/2014 | Yu |
| 2014/0176542 A1 | 6/2014 | Shohara |
| 2014/0193040 A1 | 7/2014 | Bronshtein |
| 2014/0212107 A1 | 7/2014 | Saint-Jean |
| 2014/0219634 A1 | 8/2014 | Mcintosh |
| 2014/0226953 A1 | 8/2014 | Hou |
| 2014/0232818 A1 | 8/2014 | Carr |
| 2014/0232819 A1 | 8/2014 | Armstrong |
| 2014/0245336 A1 | 8/2014 | Lewis, II |
| 2014/0300644 A1 | 10/2014 | Gillard |
| 2014/0328570 A1 | 11/2014 | Cheng |
| 2014/0341528 A1 | 11/2014 | Mahate |
| 2014/0366052 A1 | 12/2014 | Ives |
| 2014/0376876 A1 | 12/2014 | Bentley |
| 2015/0015680 A1 | 1/2015 | Wang |
| 2015/0022355 A1 | 1/2015 | Pham |
| 2015/0029089 A1 | 1/2015 | Kim |

(56) References Cited

U.S. PATENT DOCUMENTS

| | | |
|---|---|---|
| 2015/0049220 A1 | 2/2015 | Kuwata |
| 2015/0058709 A1 | 2/2015 | Zaletel |
| 2015/0085111 A1 | 3/2015 | Lavery |
| 2015/0154452 A1 | 6/2015 | Bentley |
| 2015/0178915 A1 | 6/2015 | Chatterjee |
| 2015/0186073 A1 | 7/2015 | Pacurariu |
| 2015/0220504 A1 | 8/2015 | Bocanegra Alvarez |
| 2015/0254871 A1 | 9/2015 | Macmillan |
| 2015/0256746 A1 | 9/2015 | Macmillan |
| 2015/0256808 A1 | 9/2015 | Macmillan |
| 2015/0271483 A1 | 9/2015 | Sun |
| 2015/0287435 A1 | 10/2015 | Land |
| 2015/0294141 A1 | 10/2015 | Molyneux |
| 2015/0318020 A1 | 11/2015 | Pribula |
| 2015/0339324 A1 | 11/2015 | Westmoreland |
| 2015/0341536 A1 | 11/2015 | Huang |
| 2015/0375117 A1 | 12/2015 | Thompson |
| 2015/0382083 A1 | 12/2015 | Chen |
| 2016/0005435 A1 | 1/2016 | Campbell |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0088287 A1 | 3/2016 | Sadi |
| 2016/0098941 A1 | 4/2016 | Kerluke |
| 2016/0119551 A1 | 4/2016 | Brown |
| 2016/0180501 A1 | 6/2016 | Mallet |
| 2016/0217325 A1 | 7/2016 | Bose |
| 2016/0225405 A1 | 8/2016 | Matias |
| 2016/0225410 A1 | 8/2016 | Lee |
| 2016/0234345 A1 | 8/2016 | Roberts |
| 2016/0282599 A1 | 9/2016 | Shankar |
| 2016/0343107 A1 | 11/2016 | Newman |
| 2016/0358603 A1 | 12/2016 | Azam |
| 2016/0366330 A1 | 12/2016 | Boliek |
| 2017/0006214 A1 | 1/2017 | Andreassen |
| 2019/0139188 A1 | 5/2019 | Newman |
| 2019/0362462 A1 | 11/2019 | Newman |
| 2019/0362463 A1 | 11/2019 | Newman |
| 2019/0362464 A1 | 11/2019 | Newman |
| 2020/0118240 A1 | 4/2020 | Newman |
| 2020/0286204 A1 | 9/2020 | Newman |
| 2021/0004932 A1* | 1/2021 | Newman ............... H04N 23/698 |
| 2021/0006719 A1* | 1/2021 | Newman ............ H04N 23/6812 |
| 2021/0035261 A1 | 2/2021 | Newman |
| 2021/0044725 A1* | 2/2021 | Powell .................... H04N 23/54 |
| 2021/0124155 A1* | 4/2021 | Newman ................ G02B 13/16 |
| 2021/0218894 A1* | 7/2021 | Stec ..................... H04N 23/6811 |
| 2022/0030177 A1* | 1/2022 | Newman ............. H04N 5/2624 |
| 2022/0051365 A1 | 2/2022 | Newman |
| 2023/0109047 A1 | 4/2023 | Stimm |
| 2023/0144635 A1 | 5/2023 | Newman |
| 2023/0245688 A1 | 8/2023 | Newman |
| 2023/0334616 A1 | 10/2023 | Newman |

FOREIGN PATENT DOCUMENTS

| | | |
|---|---|---|
| WO | 2009040538 A1 | 4/2009 |
| WO | 2009146319 A1 | 12/2009 |

\* cited by examiner

RECTILINEAR LENS
NON-RECTILINEAR LENS $T_0$ $CV_0$ $DV_0$ $T_1$ $CV_1$ $DV_1$ $T_2$ $CV_2$ $DV_2$ $T_0$ $CV_0$ $DV_0$ $T_1$ $CV_1$ $DV_1$ $T_2$ $CV_2$ $DV_2$

METHODS AND APPARATUS FOR ELECTRONIC IMAGE STABILIZATION BASED ON A LENS POLYNOMIAL

PRIORITY

This application claims the benefit of priority to co-owned U.S. Provisional Patent Application No. 63/267,289 entitled "METHODS AND APPARATUS FOR ELECTRONIC IMAGE STABILIZATION BASED ON A LENS POLYNOMIAL" filed Jan. 28, 2022, the contents of which are incorporated herein by reference in its entirety.

RELATED APPLICATIONS

This application is generally related to the subject matter of co-owned U.S. patent application Ser. No. 17/449,713 entitled "METHODS AND APPARATUS FOR RE-STABILIZING VIDEO IN POST-PROCESSING" filed Oct. 1, 2021, the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates to electronic image stabilization. Specifically, the present disclosure relates to correcting image artifacts introduced by the capture device, prior to electronic image stabilization.

DESCRIPTION OF RELATED TECHNOLOGY

Image stabilization refers to techniques that reduce blurring and/or jitter. Jitter may be introduced by camera motion during image capture (e.g., due to handshake or vehicle motion, etc.) When successful, image stabilization can produce sharper images and/or smoother, less jittery motion in video. Most techniques for image stabilization rely on mechanical movements, e.g., an external gimble or internal adjustment of the lens or sensor within the camera itself. In contrast, so-called electronic image stabilization (EIS) techniques use image manipulation techniques to compensate for camera motion.

Existing image manipulation techniques are based on the most common use case e.g., a steady camera and that is pointed at the scene of interest. Unfortunately, many of these assumptions do not apply to action photography; in many cases, the action camera is moving and/or may only be pointed in the general direction of interest. As described in greater detail herein, existing image manipulation techniques may introduce undesirable artifacts after image stabilization.

DETAILED DESCRIPTION

In the following detailed description, reference is made to the accompanying drawings which form a part hereof, wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Wide Angle Photography and Electronic Image Stabilization (EIS)

Figure 1:
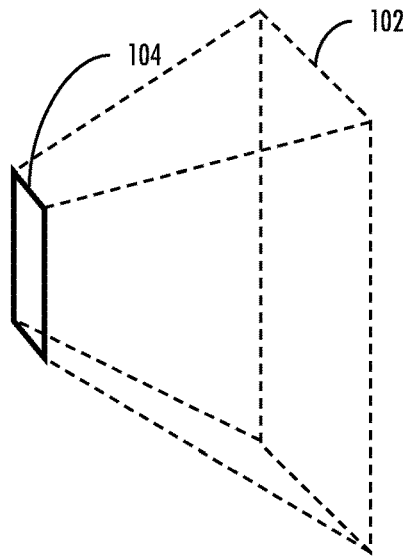
FIG. 1 is a graphical comparison of a rectilinear lens and a non-rectilinear lens, useful in explaining various aspects of the present disclosure.
Figure 1:
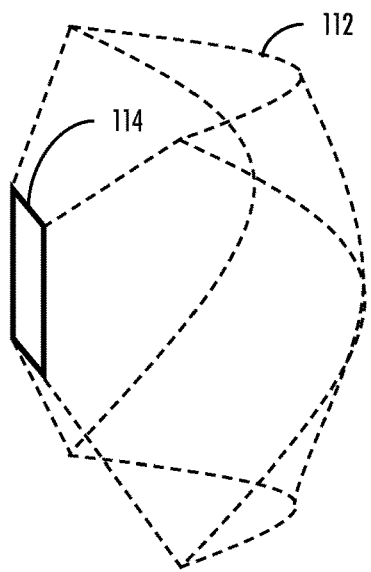
Figure 1:
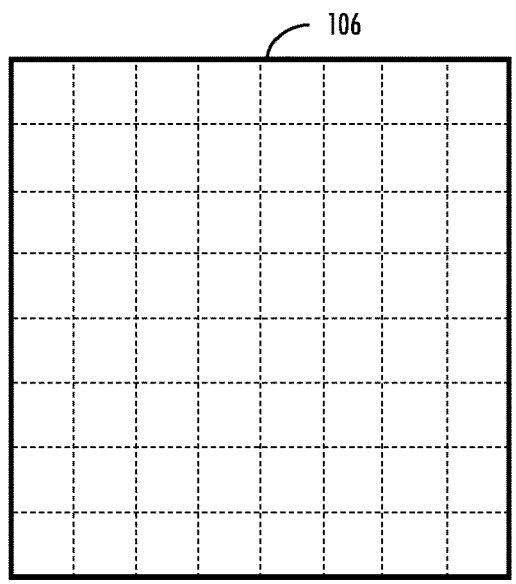
Figure 1:
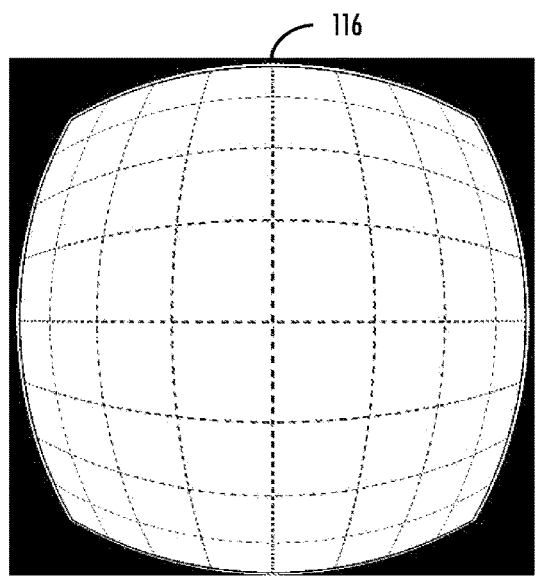

FIG. 1 depicts a graphical comparison of a rectilinear lens and a non-rectilinear lens. The rectilinear lens preserves "straightness" when focusing an image 102 onto the camera sensor 104. For instance, a rectilinear image 106 of a straight-lined grid will have straight lines. Most cameras use rectilinear lenses; however, since rectilinear lenses stretch/enlarge objects at the edge of the field-of-view, these cameras typically only capture a narrow field-of-view (between 30° to 90°).

Non-rectilinear lenses trade off rectilinearity for other desirable properties. For example, some action cameras use panoramic and/or fisheye type lenses to capture a very wide field-of-view (greater than 120°). For example, FIG. 1 also depicts a fisheye lens that focuses an image 112 onto the camera sensor 114. In this case, the straight-lined grid is captured/rendered with curved lines (non-rectilinear image 116).

Unlike most digital photography, action photography is captured under difficult conditions which are often out of the photographer's control. In many cases, shooting occurs in outdoor settings where there are very large differences in lighting (e.g., over-lit, well-lit, shaded, etc.) Additionally, the photographer may not control when/where the subject of interest appears; and taking time to re-shoot may not be an option. Since action cameras are also ruggedized and compact, the user interface (UI/UX) may also be limited. Consider an example of a mountain biker with an action camera mounted to their handlebars, recording a trip through a wilderness canyon. The mountain biker has only very limited ability to control the action camera mid-action. Interesting footage may only be fleeting moments in the periphery of capture. For instance, the mountain biker may not have the time (or ability) to point the camera at a startled deer bolting off trail. However, the action camera's wide field-of-view allows the mountain biker to re-frame the footage in post-processing, e.g., in this illustrative example, the footage can be virtually re-framed on the deer, rather than the bike path.

As a related complication, action cameras are often used while in-motion. Notably, the relative motion between the camera's motion and the subject motion can create the perception of apparent motion when the footage is subsequently viewed in a stable frame-of-reference. A variety of different stabilization techniques exist to remove undesirable camera motion. For example, so-called electronic image stabilization (EIS) relies on image manipulation techniques to compensate for camera motion.

As used herein, a "captured view" refers to the total image data that is available for electronic image stabilization (EIS) manipulation. A "designated view" of an image is the visual portion of the image that may be presented on a display and/or used to generate frames of video content. EIS algorithms generate a designated view to create the illusion of stability; the designated view corresponds to a "stabilized" portion of the captured view. In some cases, the designated view may also be referred to as a "cut-out" of the image, a "cropped portion" of the image, or a "punch-out" of the image.

Figure 2:
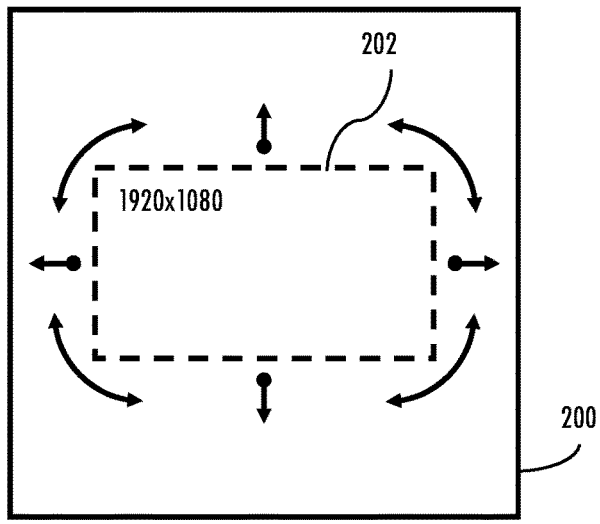
FIG. 2 is a graphical representation of in-camera stabilization and its limitations, useful in explaining various aspects of the present disclosure.
Figure 2:
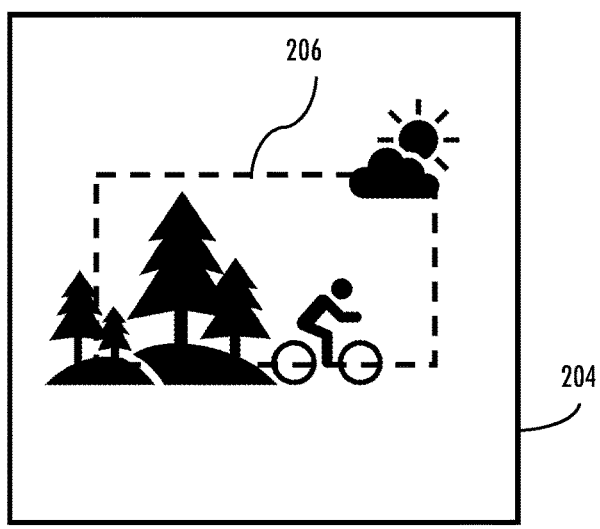
Figure 2:

Consider a camera or other imaging device that captures a series of images having a field of view. For example, as shown in FIG. 2, a total captured field of view 200 (e.g., 2880 pixels×2880 pixels) may be used to generate a stabilized high-definition (HD) output video frame 202 (e.g., 1920 pixels×1080 pixels). The EIS algorithm may select any contiguous 1920×1080 pixels and may rotate and translate the output video frame 202 within the total captured field of view 200. In this case, a camera may capture all of scene 204 but only use the narrower field of view of scene 206. After in-camera EIS, the output frame 208 can be grouped with other frames and encoded into video for transport off-camera. Since video codecs compress similar frames of video using motion estimation between frames, stabilized video results in much better compression (e.g., smaller file sizes, less quantization error, etc.)

Notably, the difference between the designated view and the captured field of view defines a "stabilization margin." The designated view may freely pull image data from the stabilization margin. For example, a designated view may be rotated and/or translated with respect to the originally captured view (within the bounds of the stabilization margin). In certain embodiments, the captured view (and likewise the stabilization margin) may change between frames of a video. Digitally zooming (proportionate shrinking or stretching of image content), warping (disproportionate shrinking or stretching of image content), and/or other image content manipulations may also be used to maintain a desired perspective or subject of interest, etc.

As a practical matter, EIS techniques must trade-off between stabilization and wasted data, e.g., the amount of movement that can be stabilized is a function of the amount of cropping that can be performed. Un-stable footage may result in a smaller designated view whereas stable footage may allow for a larger designated view. For example, EIS may determine a size of the designated view (or a maximum viewable size) based on motion estimates and/or predicted trajectories over a capture duration, and then selectively crop the corresponding designated views.

In a related tangent, images captured with sensors that use an Electronic Rolling Shutter (ERS) can also introduce undesirable rolling shutter artifacts where there is significant movement in either the camera or the subject. ERS exposes rows of pixels to light at slightly different times during the image capture. Specifically, CMOS image sensors use two pointers to clear and write to each pixel value. An erase pointer discharges the photosensitive cell (or rows/columns/arrays of cells) of the sensor to erase it; a readout pointer then follows the erase pointer to read the contents of the photosensitive cell/pixel. The capture time is the time delay in between the erase and readout pointers. Each photosensitive cell/pixel accumulates the light for the same exposure time but they are not erased/read at the same time since the pointers scan through the rows. This slight temporal shift between the start of each row may result in a deformed image if the image capture device (or subject) moves.

ERS compensation may be performed to correct for rolling shutter artifacts from camera motion. In one specific implementation, the capture device determines the changes in orientation of the sensor at the pixel acquisition time to correct the input image deformities associated with the motion of the image capture device. Specifically, the changes in orientation between different captured pixels can be compensated by warping, shifting, shrinking, stretching, etc. the captured pixels to compensate for the camera's motion.

Figure 3:
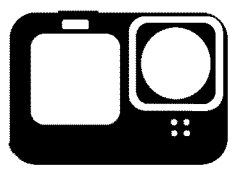
FIG. 3 is a graphical representation of electronic image stabilization (EIS) within the context of a non-rectilinear lens, useful to explain various aspects of the present disclosure.
Figure 3:
Figure 3:
Figure 3:
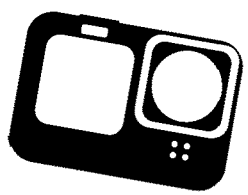
Figure 3:
Figure 3:
Figure 3:
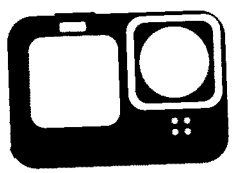
Figure 3:
Figure 3:

FIG. 3 is a graphical representation of electronic image stabilization (EIS) within the context of a non-rectilinear lens, useful to explain various aspects of the present disclosure. Notably, the image distortions provided in FIG. 3 (and in subsequent figures below) are provided for illustrative effect and are not perfectly accurate reproductions. In this illustrative example, an action camera captures images while undergoing various translations and/or rotations (captured views $CV_0$, $CV_1$, $CV_2$ at times $T_0$, $T_1$, $T_2$). The captured images are counter rotated/translated with EIS to create a stabilized video (designated views $DV_0$, $DV_1$, $DV_2$). Unfortunately, existing EIS techniques only compensate for the camera motion; as shown, the non-rectilinear lens behavior creates undesirable curvature distortions in the resulting video.

In a related tangent, action cameras are often used within a mobile device ecosystem. In many cases, a user may need to review their captured footage with only their nearby devices (e.g., an action camera, a smart phone, laptop, etc.) Ideally, the user can check "on-the-spot" to determine whether they "got the shot." The networking interfaces that are available to mobile devices often use commodity codecs and/or local wireless delivery rather than removable media data transfers (or other bulk file delivery). Under such conditions, the user may be limited by their devices' onboard resources e.g., the real-time budgets, processing bandwidth, memory buffer space, and battery capacity.

Mobile environments often rely on commodity components; in many cases, these components are greatly limited by their processing capability. Notably, a straight-line may be described with just two points; in contrast, a curve must be described with at least three points (possibly more). Many embedded systems use algorithms that rely on straight-line assumptions; as a result, curves (from lens distortions) can significantly bloat downstream processing. As but one example, any image processing techniques that assume straight-line motion (rectilinear image data) will quantize and/or approximate the curved motion into segments of straight-line motion vectors. Similarly, any image processing techniques that processes image data based on row and column addressing (e.g., 8×8 blocks, 64×64 pixel blocks, etc.) will experience lossy/high-frequency noise effects. Such techniques may include: discrete cosine transform (DCT) compression and motion estimation (commonly used in MPEG codecs), frame interpolation/extrapolation, etc. In other words, poor quantization and approximation can increase processing complexity/memory footprints and/or reduce subsequent image quality within the mobile device ecosystem.

The combination of non-rectilinear photography with image manipulation techniques in-camera and within a mobile device ecosystem creates unique new problems. To these ends, new techniques are needed for non-rectilinear image stabilization.

Exemplary Lens-Aware Electronic Image Stabilization (EIS)

Various aspects of the present disclosure are directed to a system and method for stabilizing non-rectilinear images based on a lens polynomial. Embodiments of the present disclosure "rectify" the in-camera image data based on lens polynomial information. In one exemplary embodiment, the lens-aware electronic image stabilization (EIS) leverages in-camera stabilization metadata to improve results and/or reduce processing complexity. For example, in-camera stabilization metadata can be used to determine the designated view; the designated view may be rectified according to the corresponding location within the lens polynomial. In an alternative embodiment, the captured view may be pre-rectified based on the lens polynomial and the designated view may be generated from the pre-rectified capture view. Notably, stabilized rectilinear image data is suitable for a variety of commodity components and existing image manipulation techniques, e.g., the in-camera rectified and stabilized video content can be efficiently encoded for transfer off-camera and immediately shared/viewed.

Figure 4:
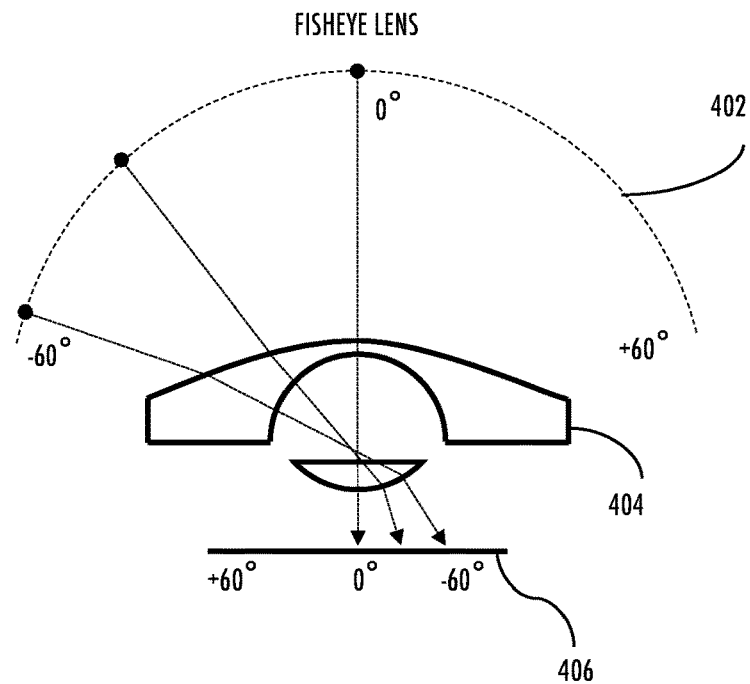
FIG. 4 is a graphical comparison of a fisheye lens and a rectilinear lens, useful in conjunction with various aspects of the present disclosure.
Figure 4:
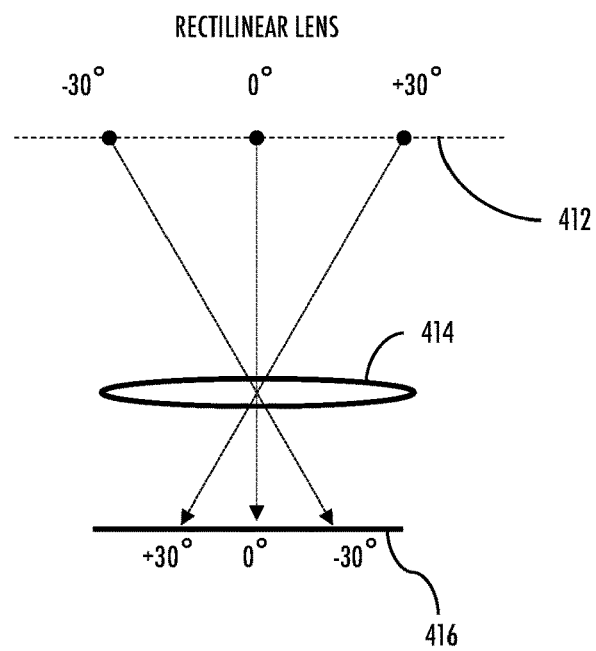

FIG. 4 is a graphical comparison of a fisheye lens and a rectilinear lens useful in conjunction with various aspects of the present disclosure. As shown, a fisheye field-of-view 402 is focused by a physical lens 404 into an image 406. In the illustrated embodiment, the field-of-view spans 120° (from −60° to +60°). In contrast, a rectilinear camera lens 414 may provide a physical field-of-view 412 that spans 60° (from −30° to +30°) when projected to image 416. Other lenses may have a greater or narrower range; e.g., hyper-hemispherical lenses may have spans greater than 180°, similarly other rectilinear lenses may provide fields-of-view anywhere from 30° to 90°. Notably, all physical lenses have physical limitations based on e.g., their materials and physical construction.

Physical lenses can be mathematically modeled within their physically limited field-of-view. In many cases, camera/lens manufacturers may provide the mathematical model in the form of a polynomial, trigonometric, logarithmic, look-up-table, and/or piecewise or hybridized functions thereof. As but one such example, an exemplary fisheye lens may be described based on a normalized sensor radius (r) as a function of angle (ϕ), for the range −60° to +60° (given by EQN.1, reproduced below):

$$\phi = 83.90432\, r - 18.26919\, r^3 + 15.51541\, r^5 - 6.51824\, r^7 \quad (1)$$

For comparison, an ideal rectilinear lens of focal length (f) may be described by EQNS. 2 and 3, below:

$$r = f\tan\phi;\, \text{or} \qquad \text{EQN 2.}$$

$$\phi = \arctan\frac{r}{f} \qquad \text{EQN 3.}$$

Figure 5:
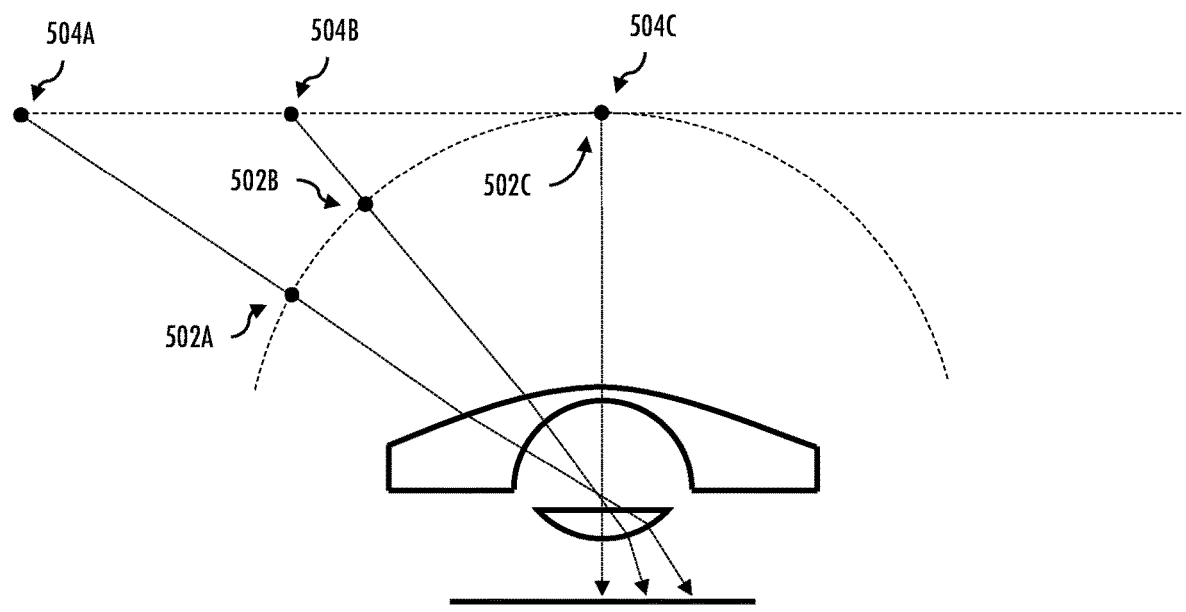
FIG. 5 is a graphical representation of a conversion from a first lens to another, in accordance with various aspects of the present disclosure.
Figure 5:
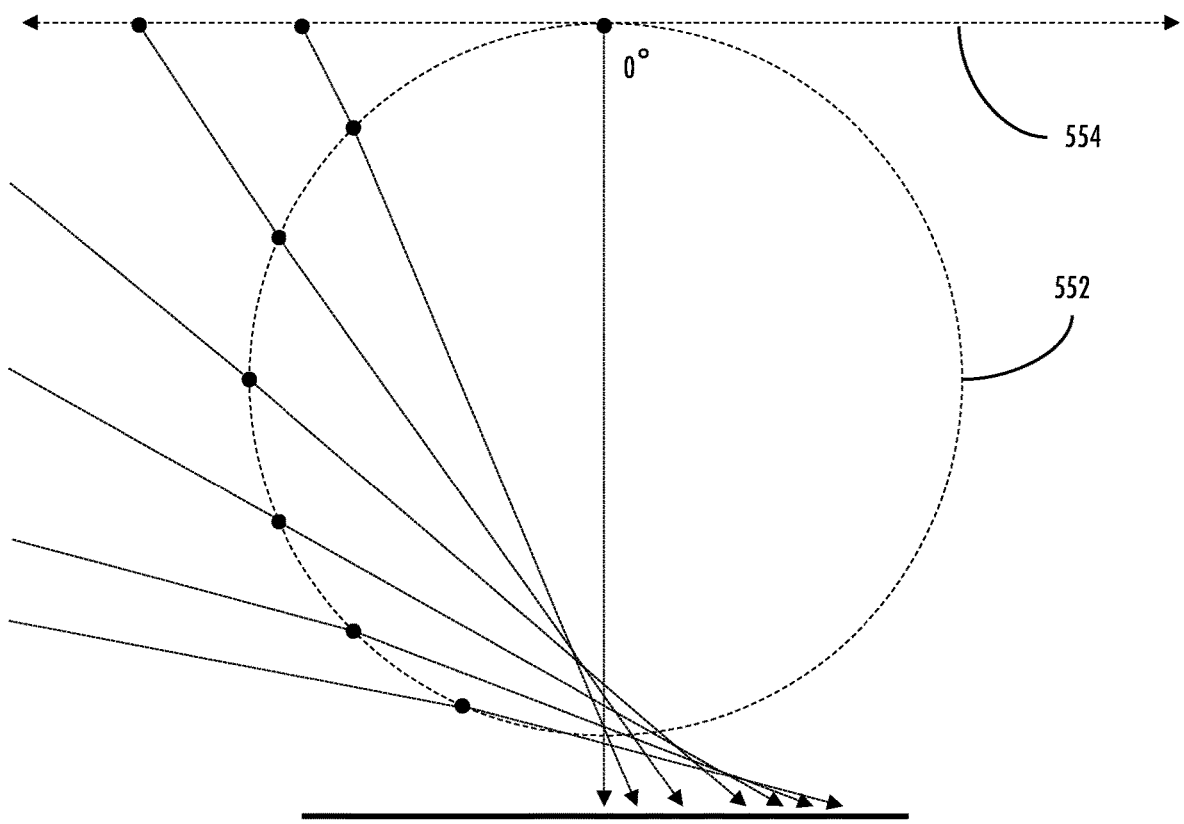

Once the physical lens has been mathematically modeled, conversions from one lens to another can be calculated and preserved as a pixel mapping (see FIG. 5). For instance, a set of points (502A, 502B, 502C) of the fisheye field-of-view is mapped to a set of corresponding points (504A, 504B, 504C) of the rectilinear field-of-view. In other words, any sensor radius (r) and its corresponding angle (ϕ) can be calculated and mapped to enable conversion from one lens description to another.

In one exemplary embodiment, an image captured with a physical lens described by EQN. 1 can be mathematically converted to an ideal rectilinear lens according to EQN. 3. Notably, the rectilinear mapping of FIG. 5 can be extrapolated out to e.g., a wider fisheye field-of-view 552 and its corresponding wider rectilinear field-of-view 554. As a practical matter, any view angle can be determined—even view angles that are not physically possible with a single lens (e.g., a 360° panoramic image can have a range from −180° to +180°). This may be particularly useful for multi-camera photography (e.g., a stitched panorama composed of multiple separate captures).

Figure 6:
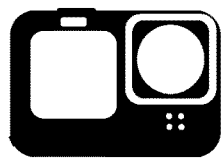
FIG. 6 is a graphical representation of electronic image stabilization (EIS) based on a lens polynomial, in accordance with various aspects of the present disclosure.
Figure 6:
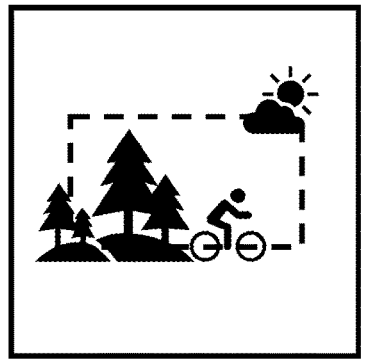
Figure 6:
Figure 6:
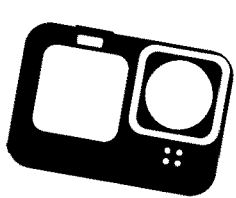
Figure 6:
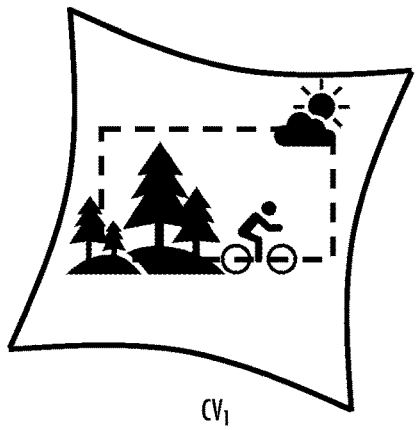
Figure 6:
Figure 6:
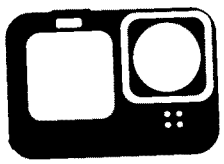
Figure 6:
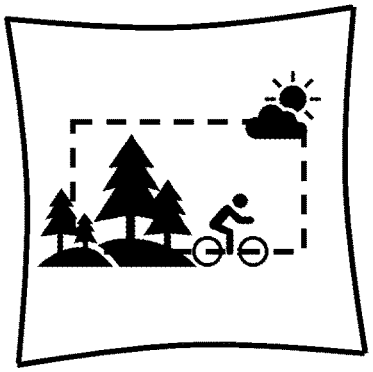
Figure 6:

Referring now to FIG. 6, a graphical representation of electronic image stabilization (EIS) based on a lens polynomial in accordance with various aspects of the present disclosure is shown. During exemplary operation, an action camera captures images while undergoing various translations and/or rotations (captured views $CV_0$, $CV_1$, $CV_2$ at times $T_0$, $T_1$, $T_2$). As shown, the originally captured views are rectified based on device motion. Once rectified, electronic image stabilization (EIS) techniques can use counter translations and/or rotations to counteract device motion (designated view $DV_0$, $DV_1$, $DV_2$). Specifically, sensor data from the accelerometer and/or gyroscope can be used to derive quaternions for device motion, and corresponding image quaternions that counteract the device motion.

As a brief aside, quaternions are four-dimensional vectors generally represented in the form $a+bi+cj+dk$ where: a, b, c, d are real numbers; and i, j, k are the basic quaternions that satisfy $i^2=j^2=k^2=ijk=-1$. Points on the unit quaternion can represent (or "map") all orientations or rotations in three-dimensional space. Quaternion calculations can be efficiently implemented in software to perform rotation and translation operations on image data, also the additional dimensionality of quaternions can prevent/correct certain types of errors/degenerate rotations (e.g., gimble lock); quaternions are often used to perform EIS manipulations (e.g., pan and tilt using matrix operations). As but one such example, an image orientation (IORI) quaternion may provide a counter-rotation/translation to a camera orientation (CORI) quaternion—in other words, the IORI represents an image orientation as a vector relative to the camera's orientation. While discussed with reference to quaternions, artisans of ordinary skill in the related art will readily appreciate that the orientation may be expressed in a variety of systems.

In one exemplary embodiment, the mapping from fisheye image data to rectilinear image data may be calculated and stored ahead of time in e.g., a look-up-table. In other implementations, the mappings may be dynamically calculated at run-time according to a mathematical relationship. Still other hybrid implementations may split the conversion into multiple stages; e.g., a fisheye capture view may be converted to a rectilinear capture view based on a look-up-table, but the designated view may be dynamically determined based on sensor data.

Figure 7:
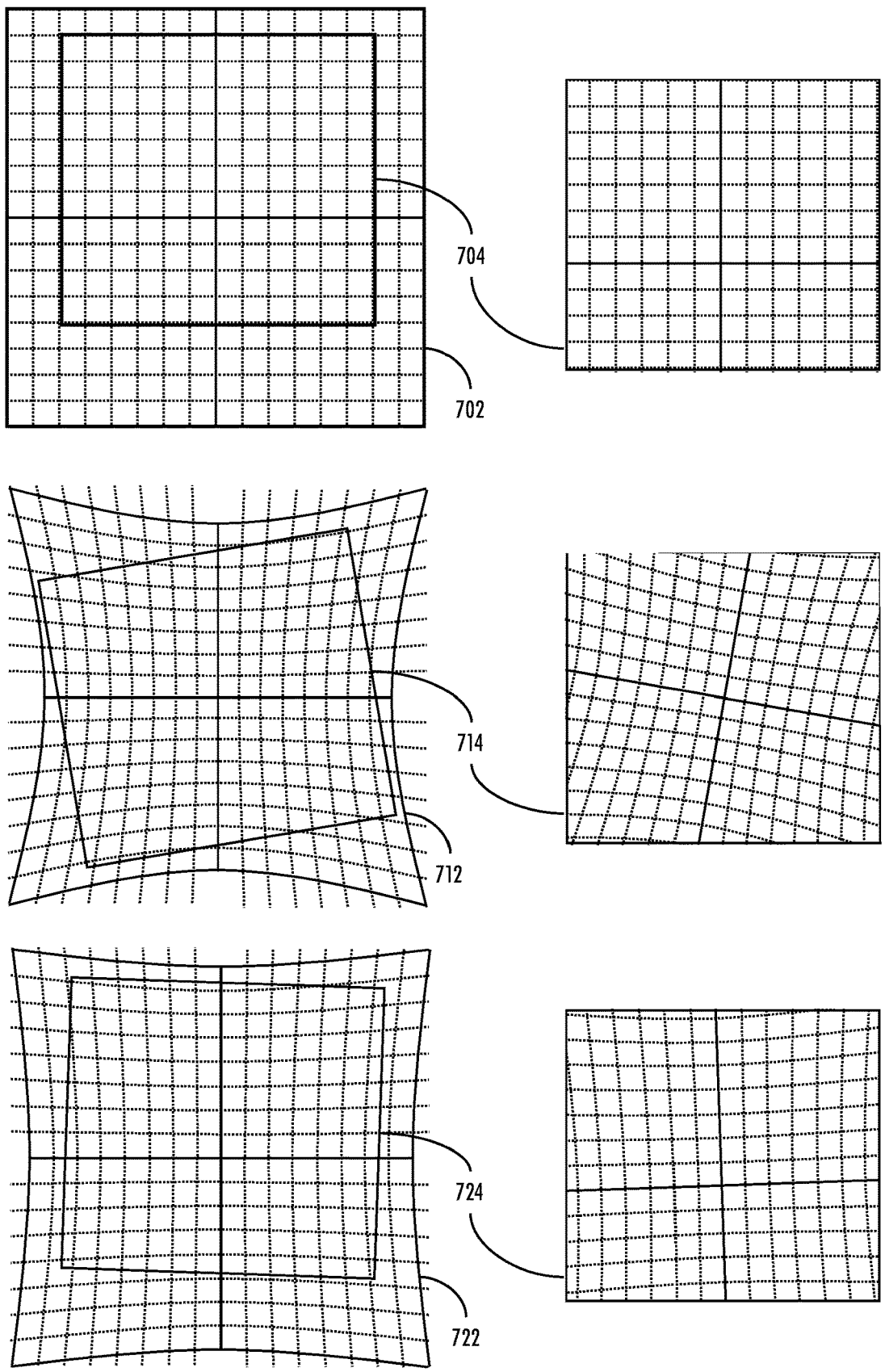
FIG. 7 is a graphical representation of rectification and stabilization from the camera sensor's frame of reference, in accordance with various aspects of the present disclosure.

Consider, for example, the graphical representation of rectification and stabilization from the camera sensor's frame of reference (FIG. 7). Here, a grid is shown to illustrate relative correspondence between different rectified and stabilized images (i.e., the grid of FIG. 7 is counter distorted to correct for the lens polynomial at different rotations, translations, and/or zooms). As shown, a first capture view 702, second capture view 712, and third capture view 722, each correspond to different zooms; similarly, a first designated view 704, a second designated view 714, and a third designated view 724, each correspond to different translation and rotations. In one exemplary embodiment, the degree of rectification corresponding to the usable portion of the capture view (e.g., first capture view 702, second capture view 712, and third capture view 722) may be determined based on the amount of digital zoom-in/zoom-out. Once the capture view has been rectified into rectilinear image data, then the cut-out of the designated views may be performed with standard row-column addressing (e.g., the first designated view 704, second designated view 714, and third designated view 724 preserve "straightness" of the image subject).

More generally, most commodity image processing techniques that are commonly used in the mobile device ecosystem will benefit from straight-line motion and/or rectilinear image data. As but one such example, the most popular codecs circa 2021-2022 (MPEG-4 H.264 (AVC) and MPEG-H H.265 (HEVC)) use discrete cosine transforms (DCT) to compress image data. First, image data is divided into chunks (e.g., 8×8 blocks, 64×64 pixel blocks, etc.); the chunks are then compressed using a two-dimensional (2D) DCT. Larger runs of horizontally or vertically adjacent pixels with similar values correspond to lower frequency DCT coefficients; diagonally adjacent pixels of similar values (e.g., curved lines) are separately encoded and typically contribute to higher frequency DCT coefficients. During subsequent compression, the high frequency coefficients are often quantized and/or entropy encoded. Since rectified image data is more likely to have long runs of horizontally/vertically adjacent pixels compared to fisheye image data, rectified image data may be more efficiently compressed at a higher fidelity through the codec pipeline.

As a related benefit, MPEG-based video compression uses pixel motion estimation between video frames to compress video frames with similar image data. Motion vectors describe straight-line motion differences between frames. Thus, straight-line motion across multiple frames can result in significant compression gains. Pixel motion between frames is based on subject motion, camera motion, and/or lens distortion. Notably, rectified footage increases straight-line motion between frames; similarly, stabilized footage reduces unnecessary motion vectors generated by the camera's motion. Additionally, the largest pixel differences due to camera movement between frames occurs at the outer edges of the designated views. Furthermore, the outer edges are also the most distorted pixels of the designated view. In other words, the pixels at the outer edges of the designated views experience the most distortion and largest differences across frames. As a result, the combined benefits of rectification and stabilization synergistically improve over the benefits of each technique performed in isolation.

In the foregoing discussion, the exemplary techniques for rectification and stabilization may be performed in-camera. Subsequent post-processing may be used to further improve, enlarge, and/or modify the rectified and/or stabilized video. Such techniques are described in co-owned U.S. patent application Ser. No. 17/449,713 entitled "METHODS AND APPARATUS FOR RE-STABILIZING VIDEO IN POST-PROCESSING" filed Oct. 1, 2021, previously incorporated herein by reference in its entirety. As described therein, previously stabilized video can be reconstructed and re-stabilized to provide for improved stabilization (e.g., a wider crop, etc.) For example, camera-aware post-processing can reuse portions of the in-camera stabilized videos while providing additional benefits (e.g., the ability to regenerate the original captured videos in post-production and re-stabilize the videos). Camera-aware post-processing can also improve orientation metadata and remove sensor error. Consequently, in some embodiments, a camera may capture and store the original capture view (pre-EIS, pre-rectification). The capture view may be stored as raw capture data, as a full image, or as a partial image (e.g., with the designated view removed, nulled, decimated, or otherwise heavily compressed). Sensor data (e.g., accelerometer and/or gyroscope data) may be captured and stored with the image/video data for later use in lens-aware post-processing. The telemetry data derived from the sensor data may be saved as a separate metadata track or alongside the video track. In some embodiments, the original capture view can be provided to a lens-aware and/or camera-aware post-processor (in addition to, or in lieu of the stable and rectified designated view) to enable subsequent post-processing. This may be particularly useful where, for example, the in-camera processing was unable to correct the image data or mis-corrected the image data due to the device's onboard resources.

Figure 8A:
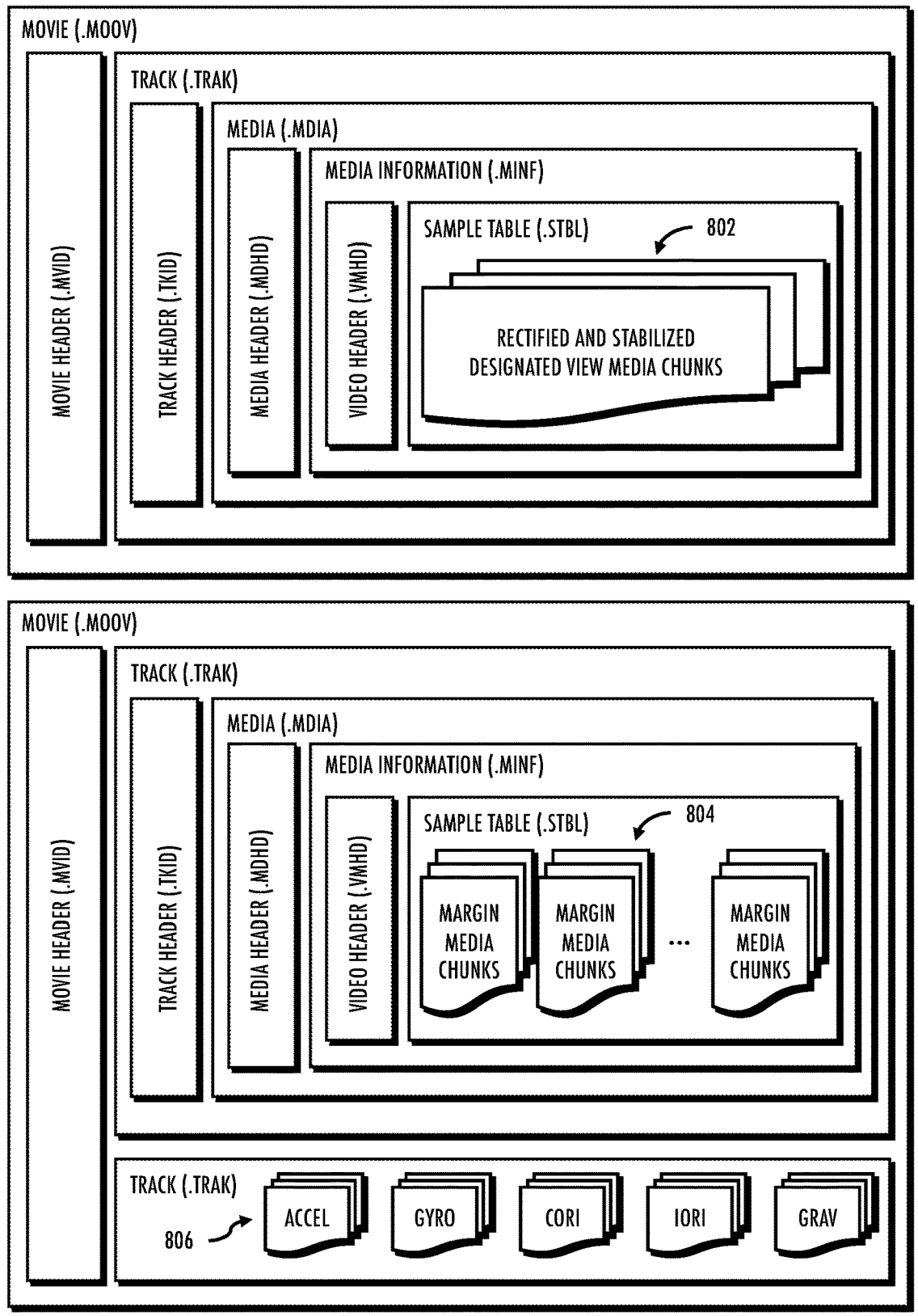
FIGS. 8A-8C provide graphical illustrations of exemplary MPEG-$_4$ file formats, useful in explaining various aspects of the present disclosure.
Figure 8B:
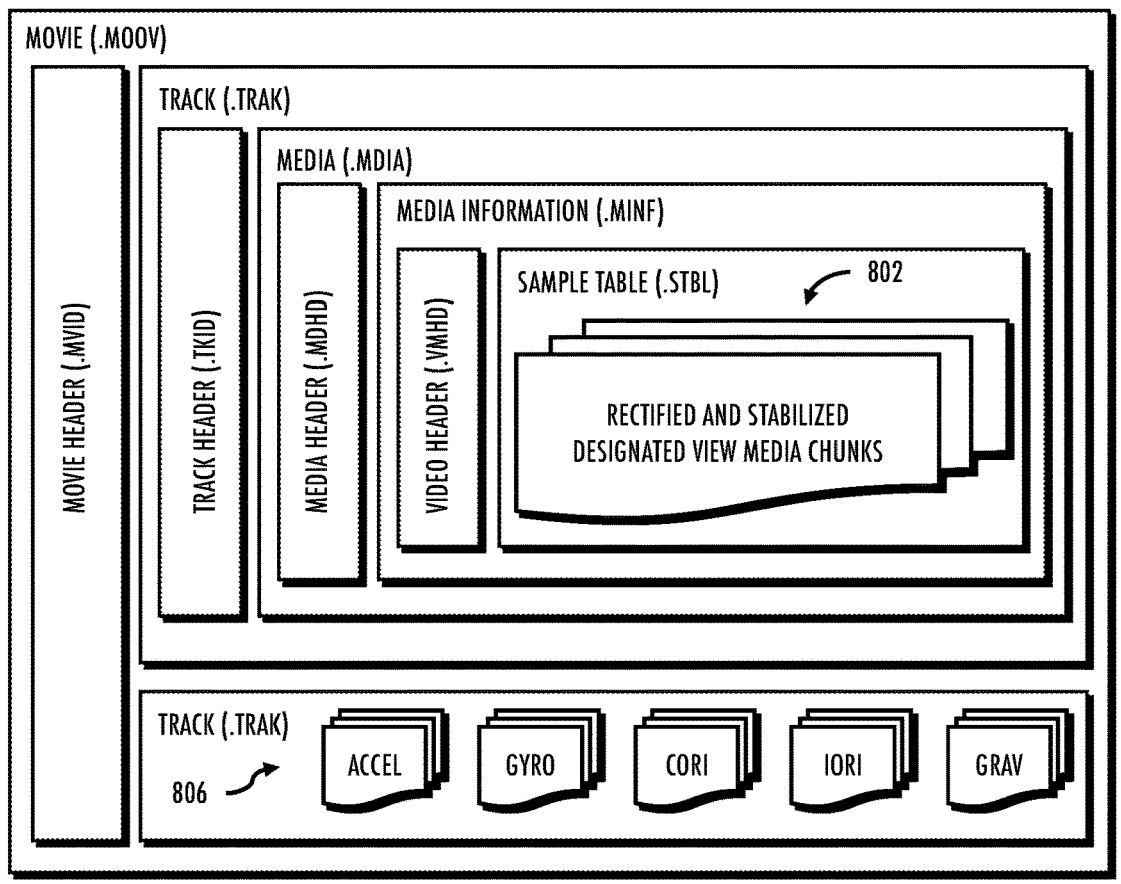
Figure 8B:
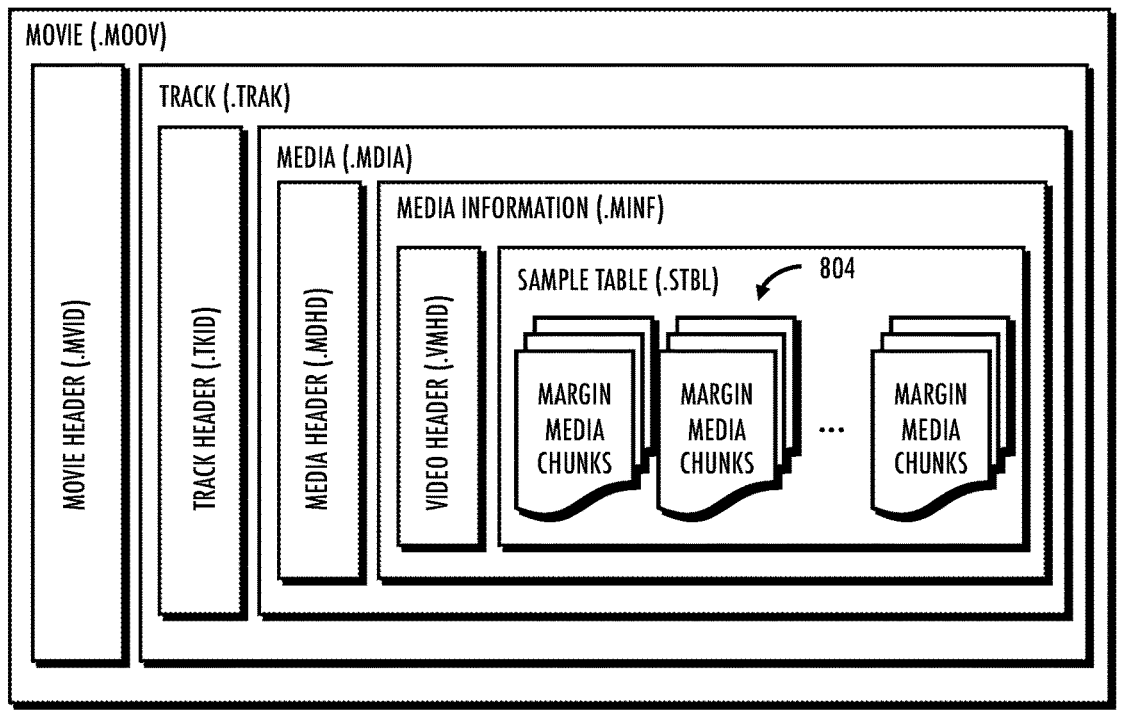
Figure 8C:
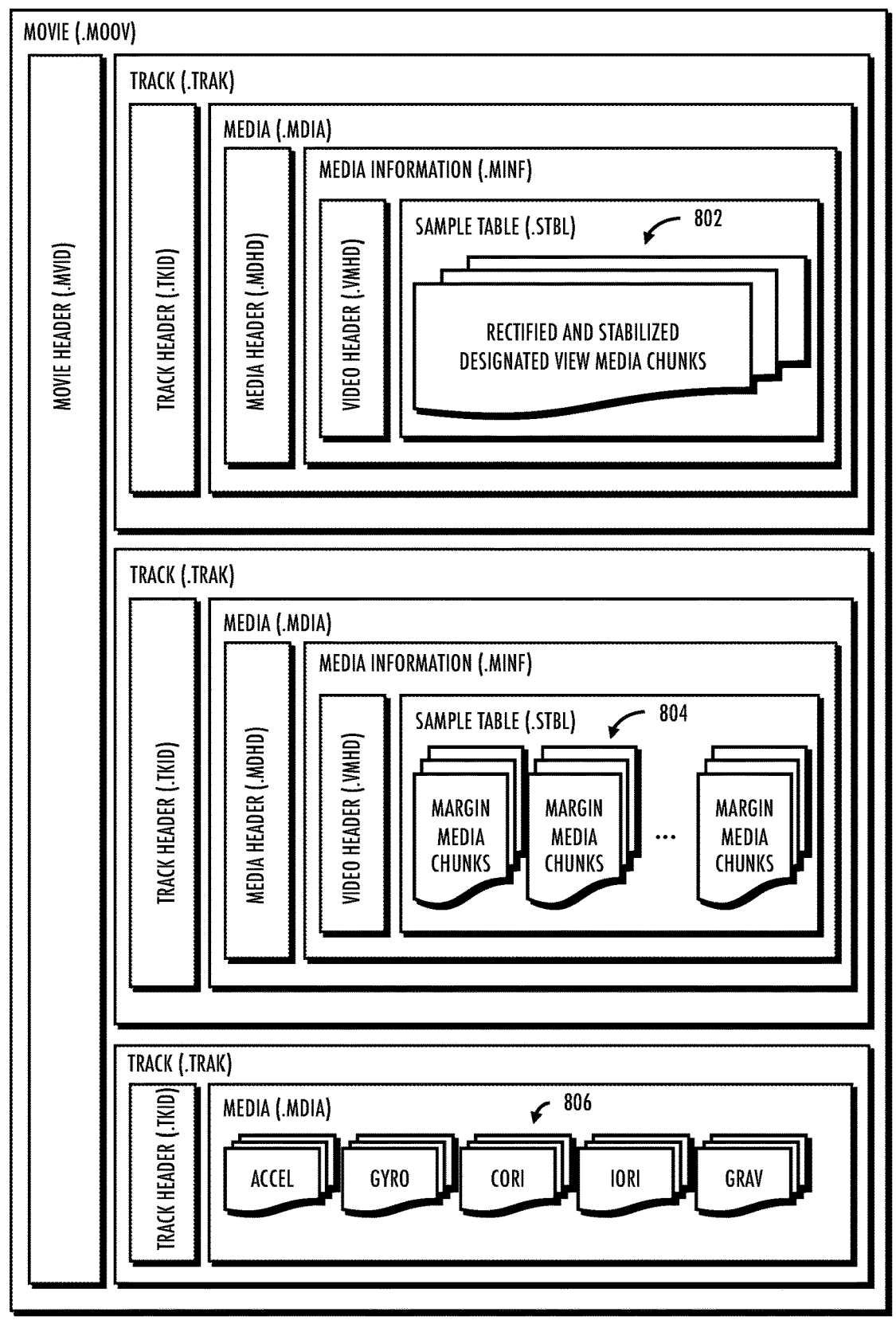

FIGS. 8A-8C provide graphical illustrations of exemplary MPEG-4 file formats, useful in explaining various aspects of the present disclosure.

FIG. 8A depicts a first configuration that stores an in-camera rectified and stabilized video (chunks of designated views 802) separate from all other data, e.g., the orientation metadata 806 and margin media chunks 804 are stored within a separate MPEG-4 container. In some embodiments, the designated view video may be easily accessed for immediate "ready-to-share" applications. Notably, the ready-to-share designated view benefits from higher compression efficiencies and reduced file sizes since the apparent motion of the designated view has been reduced by in-camera EIS and rectified to compensate for the lens distortions.

A separate MPEG-4 may include the margin media chunks 804. As previously alluded to, the camera sensor captures a consistent amount of image data which may be digitally zoomed/warped to generate the designated view; notably, the designated view may disproportionately correspond to a larger or smaller area of the total capture data. In some implementations, the margin media chunks 804 may require subsequent rectification, digital zooming, warping, smoothing and/or blending to match their corresponding chunks of designated views 802. In alternative implementations, the margin media chunks 804 may be pre-modified in-camera using the same rectification, digital zoom, warp, and/or other image content manipulations as the corresponding chunks of designated views 802.

As a practical matter, the stabilization margin track is primarily intended for subsequent camera-aware post-processing; consequently, in some optimized variants, the stabilization margin track may be optimized for access relative to the designated view (rather than an absolute location of the camera sensor). For example, a first margin chunk may be positioned relative to a corner (e.g., the uppermost right) of the designated view, the second margin chunk may be adjacent-to the first margin chunk, etc. By tiling outwards from the designated view (rather than an absolute sensor location), the camera-aware post-processor may immediately access the margin chunks that are most useful (the least likely to have been cropped out).

In some variants, the stabilization margin track may include originally captured image data that has not been rectified. Unrectified image data corresponds to the camera sensor's own frame of reference and must be accessed and subsequently rectified for blending with the previously rectified and stabilized designated view. In other variants, the stabilization margin track may include captured image data that has been rectified to remove lens distortion. Notably, each frame of rectified image data will have changing boundaries relative to the other frames; in some cases, the rectified image data may be padded with null or invalid data to achieve one-to-one correspondences with other frames.

Referring now to FIG. 8B, a second configuration is depicted that stores both the rectified and stabilized chunks of designated views 802 and the orientation metadata 806 within the same MPEG-4 container; the margin media chunks 804 may be stored separately in a sidecar file structure. The implementation of FIG. 8B may be useful for camera-aware codecs and/or applications that can dynamically adjust replay based on the orientation metadata (horizon leveling, etc.) In some cases, the adjustments may be made dynamically on a frame-by-frame basis. Margin media chunks 804 may be stored separately, and retrieved when necessary (e.g., for lens-aware and camera-aware post-processing.) FIG. 8C depicts a third configuration that stores all media components within the same MPEG-4 container. Such implementations may be suitable for long term archival and/or bulk file transfers.

Technological Improvements and Other Considerations

While there may exist some post-processing techniques for non-rectilinear images and/or electronic image stabilization, the current content delivery ecosystem (circa 2021-2022) is dominated by commodity components that are optimized for a wide variety of rectilinear screens/presentation formats. In other words, the existing techniques for image manipulation are hardware agnostic (unaware of lens geometry) and typically service a wide variety of different components with different characteristics. In one specific aspect, the stabilization and rectification schemes described herein are specifically designed to compensate for the physical lens of the source device (e.g., using the lens polynomial) and the telemetry data during capture (accelerometer and gyroscope), etc. In this manner, the resulting encoded video minimizes lens curvature effects through the commodity codec pipeline/content delivery network. More directly, the various solutions described herein are not abstract since they are tied to specific machine capabilities and limitations.

Additionally, the above-described system and method solves a technological problem in industry practice related to post-processing flexibility. Unlike traditional photographic composition where the subject-of-interest is "shot" within a narrow field-of-view, action cameras often roll footage without any clear user instruction as to the subject of interest. This may be particularly problematic for ecosystems that capture fleeting/ephemeral footage, or that provide the user the flexibility to perform arbitrary image compositions. Specifically, cutouts of non-rectilinear content may have a variety of different lens artifacts that are introduced by the relative position of the cutout within the original capture; this can be particularly distracting in moving video. In one specific aspect, sink devices can obtain stabilized and rectified image and/or margin data. This allows the sink device to flexibly adjust the framing/re-framing based on its local application considerations rather than compensating for capture device peculiarities. The various solutions described herein improve computer functionality by simplifying subsequent modification and the image quality of previously captured non-rectilinear footage.

Furthermore, the above-described system and method solves a technological problem in industry practice related to efficient transfer of non-rectilinear content. Commodity codecs are optimized for traditional content that is rectilinear; many codec optimizations rely on linear motion vectors and straight-line perspective. As a result, transferring non-rectilinear content between devices is inefficiently handled by commodity codecs (e.g., at the source device, via intermediary devices, and/or at destination devices). In other words, even though post-processing applications can benefit from rectification and stabilization of content, the lossy nature of content delivery often results in reduced image quality, larger file transfers, and/or inefficient processing when compared to the techniques described herein. Consequently, the various solutions described herein improve computer functionality by increasing data transfer fidelity and reducing data transfer complexity.

Exemplary Image Data Capture/Processing Architecture

Figure 9:
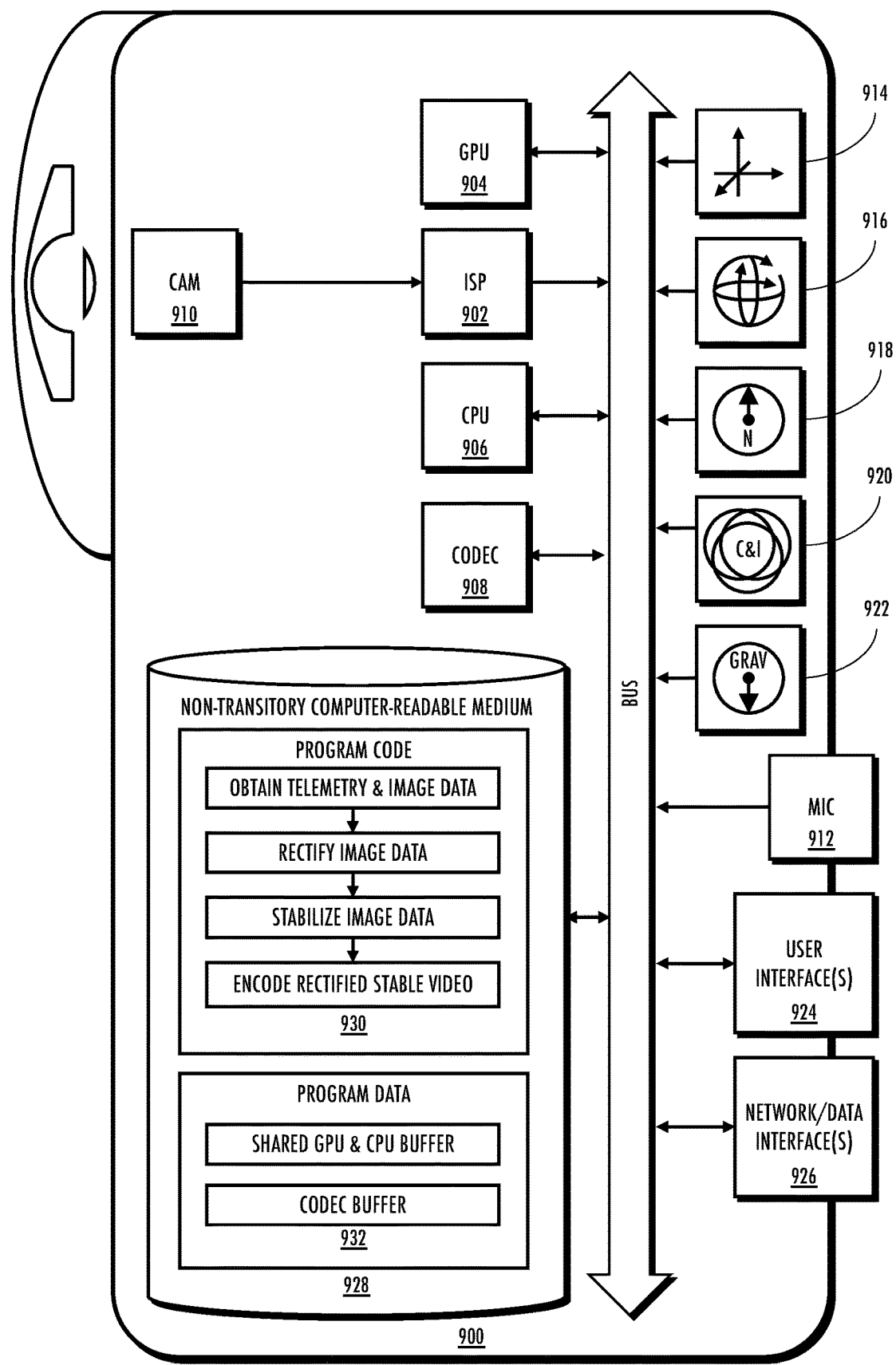
FIG. 9 is a logical block diagram of a source device, useful in conjunction with various aspects of the present disclosure.

FIG. 9 is a logical block diagram of a source device 900, useful in conjunction with various aspects of the present disclosure. The source device 900 includes a processor subsystem, a memory subsystem, a sensor subsystem, a user interface subsystem, a network/data interface subsystem, and a bus to connect them. During operation, telemetry data and image content is captured via the sensor subsystem, the image content is rectified based on a lens polynomial and the telemetry data, the rectified image data is then stabilized and encoded for transfer via the data interface subsystem. In one exemplary embodiment, the source device 900 may be an action camera that captures audio and/or video footage. Other embodiments of source devices may include without limitation: a smart phone, a tablet, a laptop, an aerial drone, security cameras, self-driving cars, smart appliances and/or industrial automation, and/or any other source of data.

In one embodiment, the processor subsystem may read instructions from the memory subsystem and execute them within one or more processors. The illustrated processor subsystem includes: an image signal processor (ISP 902), a graphics processing unit (GPU 904), a central processing unit (CPU 906), and a hardware codec 908. In one specific implementation, the ISP 902 maps captured camera sensor data to a linear color space. ISP operations may include without limitation: demosaicing, color correction, white balance, and/or autoexposure. In one specific implementation, the GPU 904 performs in-device modifications to image data; GPU tasks may be parallelized and/or constrained by real-time budgets. GPU operations may include, without limitation: lens corrections (stitching, warping, stretching), image corrections (shading, blending), noise reduction (filtering, etc.) In one specific implementation, the CPU 906 controls device operation and/or performs tasks of arbitrary complexity/best-effort. CPU operations may include, without limitation: operating system (OS) functionality (power management, UX), memory management, etc. In one specific implementation, the hardware codec 908 converts image data to an encoded data for transfer and/or converts encoded data to image data for playback. Other processor subsystem implementations may multiply, combine, further subdivide, augment, and/or subsume the foregoing functionalities within these or other processing elements. For example, multiple ISPs may be used to service multiple camera sensors. Similarly, codec functionality may be subsumed with either GPU or CPU operation via software emulation.

In one embodiment, the sensor subsystem may sense the physical environment and capture and/or record the sensed data. In some embodiments, the sensor data may be further stored as a function of capture time (so-called "tracks"). Tracks may be synchronous (aligned) or asynchronous (non-aligned) to one another. The illustrated sensor subsystem includes: a camera sensor 910, a microphone 912, an accelerometer (ACCL 914), a gyroscope (GYRO 916), a magnetometer (MAGN 918). In the illustrated implementation, combinations of the sensed data can be used to derive translational and/or rotational movements; such derived data may include: camera orientation and/or image orientation quaternions (CORI/IORI 920) as well as gravity vectors (GRAV 922).

In one exemplary embodiment, a camera lens bends (distorts) light to focus on the camera sensor 910. In one specific implementation, the optical nature of the camera lens is mathematically described with a lens polynomial. More generally however, any characterization of the camera lens' optical properties may be substituted with equal success; such characterizations may include without limitation: polynomial, trigonometric, logarithmic, look-up-table, and/or piecewise or hybridized functions thereof. In one variant, the camera lens provides a wide field-of-view greater than 90°; examples of such lenses may include e.g., panoramic lenses 120° and/or hyper-hemispherical lenses 180°. More generally however, the various techniques described herein may be broadly applied to any camera lens or set of camera lenses; including e.g., narrow field-of-view (30° to 90°) and/or stitched variants (e.g., 360° panoramas). While the foregoing techniques are described in the context of perceptible light, the techniques may be applied to other EM radiation capture and focus apparatus including without limitation: infrared, ultraviolet, and/or X-ray, etc.

In one specific implementation, the camera sensor 910 senses light (luminance) via photoelectric sensors (e.g., CMOS sensors). A color filter array (CFA) value provides a color (chrominance) that is associated with each sensor. The combination of each luminance and chrominance value provides a mosaic of discrete red, green, blue value/positions, that may be "demosaiced" to recover a numeric tuple (RGB, CMYK, YCrCb, etc.) for each pixel of an image.

In one specific implementation, the microphone 912 senses acoustic vibrations and converts the vibrations to an electrical signal (via a transducer, condenser, etc.) The electrical signal may be further transformed to frequency domain information. In one specific implementation, the accelerometer (ACCL 914) measures acceleration and gyroscope (GYRO 916) measure rotation in one or more dimensions. These measurements may be mathematically converted into a four-dimensional (4D) quaternion to describe the device motion, and electronic image stabilization (EIS) may be used to offset image orientation to counteract device motion (e.g., CORI/IORI 920). In one specific implementation, the magnetometer (MAGN 918) may provide a magnetic north vector (which may be used to "north lock" video and/or augment location services such as GPS), similarly the accelerometer (ACCL 914) may also be used to calculate a gravity vector (GRAV 922). Other sensor subsystem implementations may multiply, combine, further subdivide, augment, and/or subsume the foregoing functionalities within these or other processing elements. For example, two or more cameras may be used to capture panoramic (e.g., wide or 360°) or stereoscopic content. Similarly, two or more microphones may be used to record stereo sound.

In one embodiment, the user interface subsystem may be used to present media to, and/or receive input from, a human user. In some embodiments, media may include audible, visual, and/or haptic content. Examples include images, videos, sounds, and/or vibration. In some embodiments, input may be interpreted from touchscreen gestures, button presses, device motion, and/or commands (verbally spoken). The user interface subsystem may include physical components (e.g., buttons, keyboards, switches, scroll wheels, etc.) or virtualized components (via a touchscreen). In one exemplary embodiment, the user interface subsystem 924 may include an assortment of a touchscreen, physical buttons, and a microphone.

In one embodiment, the network/data interface subsystem may be used to receive data from, and/or transmit data to, other devices. In some embodiments, data may be received/transmitted as transitory signals (e.g., electrical signaling over a transmission medium.) In other embodiments, data may be received/transmitted as non-transitory symbols (e.g., bits read from non-transitory computer-readable mediums.) The network/data interface subsystem may include: wired interfaces, wireless interfaces, and/or removable memory media. In one exemplary embodiment, the network/data interface subsystem 926 may include network interfaces including, but not limited to: Wi-Fi, Bluetooth, Global Positioning System (GPS), USB, and/or Ethernet network interfaces. Additionally, the network/data interface subsystem 926 may include data interfaces such as: SD cards (and their derivatives) and/or any other optical/electrical/magnetic media (e.g., MMC cards, CDs, DVDs, tape, etc.)

In one embodiment, the memory subsystem may be used to store data locally at the source device 900. In one exemplary embodiment, data may be stored as non-transitory symbols (e.g., bits read from non-transitory computer-readable mediums.) In one specific implementation, the memory subsystem 928 is physically realized as one or more physical memory chips (e.g., NAND/NOR flash) that are logically separated into memory data structures. The memory subsystem may be bifurcated into program code 930 and/or program data 932. In some variants, program code and/or program data may be further organized for dedicated and/or collaborative use. For example, the GPU and CPU may share a common memory buffer to facilitate large transfers of data therebetween. Similarly, the codec may have a dedicated memory buffer to avoid resource contention.

In one embodiment, the program code includes non-transitory instructions that when executed by the processor subsystem cause the processor subsystem to perform tasks which may include: calculations, and/or actuation of the sensor subsystem, user interface subsystem, and/or network/data interface subsystem. In some embodiments, the program code may be statically stored within the source device 900 as firmware. In other embodiments, the program code may be dynamically stored (and changeable) via software updates. In some such variants, software may be subsequently updated by external parties and/or the user, based on various access permissions and procedures.

In one embodiment, the tasks are configured to obtain telemetry data and image data. The exemplary embodiments described above are presented in the context of an action camera that captures wide field-of-view video, however the techniques described herein may be broadly generalized to a variety of other applications and/or implementations with equal success.

In one embodiment, image data may include pixel information (e.g., chrominance and/or luminance data) that is organized according to spatial coordinates. In one specific embodiment, the image data is focused by a lens onto a two-dimensional (2D) color filter array and its corresponding set of photosensors. The photosensors may be organized according to rows and columns. Multiple images may be collected in succession to create video images. Other imaging techniques may be substituted with equal success, including e.g. 3D imaging. Examples of 3D imaging include without limitation light-field cameras, magnetic resonance, and/or infrared imaging.

In some implementations, the image data may identify a subject of interest. For example, facial recognition, feature and/or edge detection can be used to identify salient features in the image data that are (usually) associated with the subject of interest. In such variants, feature tracking may be used to keep the subject of interest within the designated view. In other examples, the subject of interest may be inferred from the camera's orientation; e.g., the camera's orientation may be used as an assumed direction of interest; in some cases, electronic image stabilization of the camera's actual trajectory may be used to provide a designated view that substantially aligns with the direction of interest (without undesirable camera shake).

In some implementations, the image data may include multiple images that are captured from multiple capture sensors. For example, two hyper-hemispherical cameras arranged back-to-back (a so-called "Janus" configuration) may be used to capture a 360° spherical content. Other implementations may use 4, 6, or even more cameras that are arranged in spatially different orientations. Still other implementations may use multiple cameras to capture the same subject-of-interest under different exposure settings; so-called High Dynamic Range photography may composite 3-5 captures at different exposure settings (brackets) to emulate a larger dynamic range than the camera readout.

In one embodiment, the telemetry data describes movement of a camera device and/or its relative positioning to a subject of interest. In one implementation, accelerometer, gyroscope, and/or magnetometer data are sensed and used to derive quaternions that describe a camera's motion and/or its captured image motion. Dimensional movement may be directly measured or inferred. Directly sensed embodiments may use external reference positioning; examples of such techniques may include triangulation (e.g., GPS, GLONASS, etc.), sounding/ranging (sonar, lidar, etc.), image analysis, explicit location data (e.g., provided from another device), and/or any other such technique. Inferred embodiments may determine motion based on sensor data and inferred movement. For example, accelerometer data may be used to calculate linear displacement and/or velocity; similarly, gyroscope data may be used to calculate rotation, angular velocity, etc. Notably, any source of motion information may be substituted with equal success.

In some implementations, the camera's orientation (CORI) is distinct from the captured image orientation (IORI); the relative difference between the IORI and CORI compensate (counteract) for camera motion. In other implementations, the orientation of a subject of interest (SORI) may be tracked relative to the camera's motion. For example, facial recognition software may be used to frame a designated view according to a moving face. Still other implementations may only use a camera orientation; for example, the camera's point-of-view may be directly used as the resulting image's point-of-view.

While the foregoing discussion is presented in the context of videos for consumer electronics, the techniques may be applied with equal success to machine vision applications. Machine vision often has different considerations than human applications. As but one such example, self-driving cars may use arrays of fisheye cameras to capture overlapping coverage of the car's surroundings and driving environment. Similarly, surveillance, industrial, and/or medical imagery may use cameras that fit into very small devices (e.g., endoscopes, etc.) or provide extra-spectral/multi-dimensional information (e.g., infrared, x-ray, MRI, etc.). Notably, however, training data, modeling, and/or human interface components are often rectilinear for the human operator. For example, training data may be based on existing libraries of rectilinear photographs. Similarly, infrared, x-ray, 3D MRI information may be converted to colors and dimensions that are suitable for human analysis. The techniques described herein may further simplify and/or improve machine vision complexity. For example, it may be infeasible to train a self-driving car on all of the possible apparent motion within fisheye data (e.g., a standing/moving pedestrian at a crosswalk while the car is idle, turning toward, turning away, etc.)—rectified and stabilized content may be used to remove apparent motion contributed by the car itself, which may greatly reduce training. Additionally, the self-driving car may use rectilinear heuristics (which may be less complex than non-rectilinear analogues) for collision avoidance in real-time. Similarly, surveillance, industrial, and/or medical imagery applications may use rectified and stabilized imaging to simplify e.g., feature detection, navigation and/or other control processes.

Furthermore, the aforementioned exemplary camera captures telemetry data and image data, however other techniques for obtaining telemetry data and/or image data may be substituted with equal success. As but one such variant, the techniques may be broadly applied to any number of cameras and/or capture modalities. For example, telemetry data and/or image data may be externally recorded and provided via e.g., explicit messaging. As another example, post-processing applications may retrieve previously captured telemetry data and/or image data and perform the rectification/stabilization process in "post". Still other data delivery mechanisms may "push" data to the device and/or "pull" data from other devices. In still other implementations, telemetry data and/or image data may be generated and/or augmented. For example, augmented/virtual reality applications may capture and modify non-rectilinear image data according to a rectilinear computer-generated model. Similarly, real world telemetry data may be modified according to the virtualized environment and/or user's interactions. More generally, any scheme for obtaining either telemetry data and/or image data may be substituted with equal success.

Referring back to FIG. 9, the tasks may additionally be configured to rectify the image data and/or stabilize the image data. While the foregoing discussion is presented in the context of a specific order (rectification and then stabilization), other implementations may change the order. For example, the camera may have a lens attachment that modifies the lens polynomial (or may not have its lens characteristics); such implementations may stabilize in-camera and rectify off-camera. As but another example, real-time processing and/or onboard memory constraints may be unable to handle rectification (or even full stabilization)—in such implementations, rectification and/or stabilization may be performed in post. Still other implementations may stabilize in real-time, and subsequently rectify on a best effort, or as-needed, basis. As a practical matter, small lens distortions that are imperceptible (or below an acceptable threshold) may not need to be rectified. Still other variations of the foregoing may be substituted with equal success given the contents of the present disclosure.

In one exemplary embodiment, the image data is rectified based on lens characteristics (e.g., a lens polynomial) and/or telemetry data. As used herein, the term "rectify" and "rectified" refer to image data that is converted from a non-rectlinear projection to a rectilinear projection. While the foregoing examples are described in the context of a fisheye lens that is converted to a rectilinear field-of-view based on a point-to-point mapping (see e.g., FIG. 5 described above), the various techniques may be broadly extended to any lens conversion. Other lens conversions may convert image data between: standard lenses, telephoto lenses, wide angle lenses, fisheye lenses, macro lenses, and/or tilt shift lenses.

In one exemplary embodiment, the image data is stabilized based on action camera sensor data. Notably, action cameras are designed to tolerate considerable camera shake; however, camera stabilization is common in other photography applications. Generally, narrower field-of-view photography (e.g., telephoto and macro lenses) may be extremely sensitive to, or intolerant to, any camera shake. More broadly, the techniques described in the present disclosure may be broadly applicable to other fields of photography. As but one such example, consider a bird watcher that takes telephoto video of a bird on a makeshift tripod; post-processing may correct for small variations in the lens due to tripod shake. Similarly, astral photography may attempt to capture constellations by taking multiple exposures; each exposure may use stabilization to improve the captured images.

In one exemplary embodiment, the tasks are configured to encode the stabilized and/or rectified data into video. In some variants, the encoded file may be an MPEG-based file according to e.g., High Efficiency Video Coding (HEVC) codecs (H.265), and/or Advanced Video Coding (AVC) codecs (H.264); other codec types may be substituted with equal success. In some embodiments, the encoded file may additionally include tracks of margin data, originally captured video, and/or intermediary image data that may be rectified and/or stabilized. In some such variants, the encoded file may include metadata that identifies the relative stabilization/rectification of the margin tracks. Additionally, some variants may include original telemetry data corresponding to the device orientation and/or its relative image orientation.

As a brief aside, transfer encoding may take a variety of different forms and/or protocols. For example, MPEG-4 media content may be subdivided and additionally encapsulated according to an MPEG-2 transport format to enable live streaming delivery. In other cases, MPEG-4 media content may be encoded into a single monolithic file (for bulk data transfer). More directly, any number of delivery techniques may be substituted with equal success. While the foregoing discussion is presented in the context of source device driven transfer, other schemes may responsively serve content (e.g., where the source device responds to requests from another device). For example, a live streaming embodiment may allow a source device to service requests on a first-come-first-serve basis from other devices.

While the foregoing discussion is presented in the context of off-device transfer, the techniques may be modified for any number of on-device hardware limitations. Alternative implementations may select video coding that is specific to storage, processing complexity, and/or performance on-device. For example, a storage network may select different compression qualities depending on whether the content is stored in long term archival (e.g., aggressive compression may be preferred) or for cached delivery (e.g., frequent usage may offset compression benefits). In another such example, on-device compression may be selected for processing considerations e.g., certain processors may be optimized for 8-bit, 16-bit words, 32-bit, etc.

Figure 10:
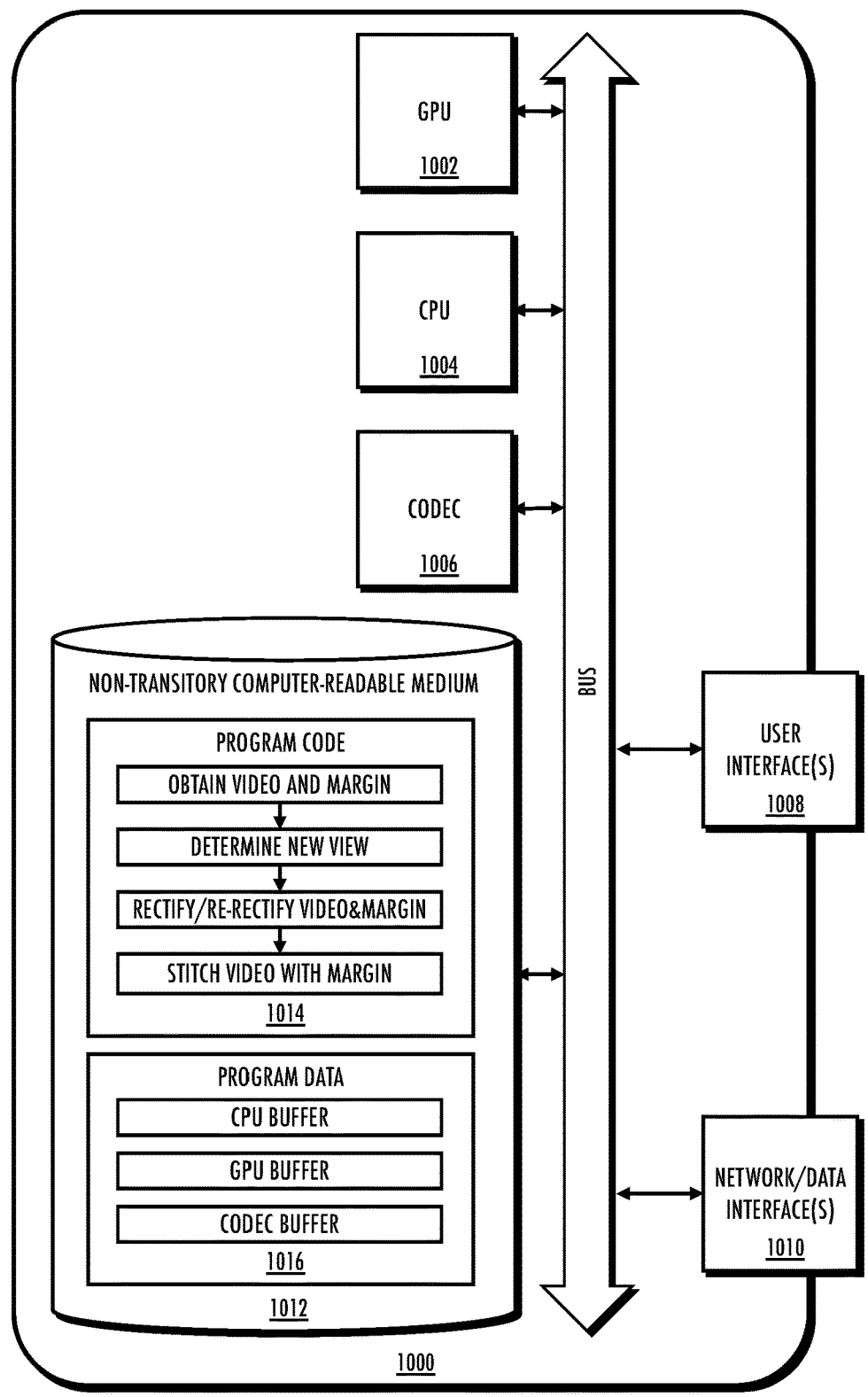
FIG. 10 is a logical block diagram of a sink device, useful in conjunction with various aspects of the present disclosure.

Referring now to FIG. 10, a logical block diagram of a sink device 1000 useful in conjunction with various aspects of the present disclosure is presented. The sink device 1000 includes a processor subsystem, a memory subsystem, a user interface subsystem, a network/data interface subsystem, and a bus to connect them. During exemplary operation, video content is obtained along with margin content (either of which may, or may not, be rectified); the video and margin content may be re-rectified (or first rectified) and stitched to modify the video capture (e.g., to re-frame or enlarge the video). In one exemplary embodiment, the sink device 1000 may be a smart phone that plays audio and/or video footage. Other embodiments of source devices may include without limitation: an action camera, a tablet, a laptop, a television, a workstation, and/or any other sink of data.

In one embodiment, the processor subsystem may read instructions from the memory subsystem and execute them within one or more processors. The illustrated processor subsystem includes: a graphics processing unit (GPU 1002), a central processing unit (CPU 1004), and a codec 1006. Other processor subsystem implementations may multiply, combine, further subdivide, augment, and/or subsume the foregoing functionalities within these or other processing elements. For example, multiple GPUs may be used to perform high complexity image operations in parallel. Similarly, codec functionality may be subsumed with either GPU or CPU operation via software emulation.

In one embodiment, the user interface subsystem may be used to present media to, and/or receive input from, a human user. The user interface subsystem may include physical components (e.g., buttons, keyboards, switches, scroll wheels, etc.) or virtualized components (via a touchscreen). In one exemplary embodiment, the user interface subsystem 1008 may include an assortment of a display, touchscreen, physical buttons, speaker(s), and a microphone.

In one embodiment, the network/data interface subsystem may be used to receive data from, and/or transmit data to, other devices. The network/data interface subsystem may include: wired interfaces, wireless interfaces, and/or removable memory media. In one exemplary embodiment, the network/data interface subsystem 1010 may include network interfaces including, but not limited to: Wi-Fi, Bluetooth, Global Positioning System (GPS), USB, and/or Ethernet network interfaces. Additionally, the network/data interface subsystem 1010 may include data interfaces such as: SD cards (and their derivatives) and/or any other optical/electrical/magnetic media (e.g., MMC cards, CDs, DVDs, tape, etc.)

In one embodiment, the memory subsystem may be used to store data locally at the sink device 1000. In one exemplary embodiment, data may be stored as non-transitory symbols (e.g., bits read from non-transitory computer-readable mediums.) In one specific implementation, the memory subsystem 1012 is physically realized as one or more physical memory chips (e.g., NAND/NOR flash) that are logically separated into memory data structures. The memory subsystem may be bifurcated into program code 1014 and/or program data 1016. In some variants, program code and/or program data may be further organized for dedicated and/or collaborative use. For example, a multicore GPU and/or CPU system may allocate dedicated memory buffers to facilitate parallelized operation. Similarly, the codec may have a dedicated memory buffer to avoid resource contention.

In one embodiment, the program code includes non-transitory instructions that when executed by the processor subsystem cause the processor subsystem to perform tasks which may include: calculations, and/or actuation of the user interface subsystem and/or network/data interface subsystem. In some embodiments, the program code may be statically stored within the sink device 1000 as firmware. In other embodiments, the program code may be dynamically stored (and changeable) via software updates. In some such variants, software may be subsequently updated by external parties and/or the user, based on various access permissions and procedures.

In one embodiment, the tasks are configured to obtain a video and its corresponding margin tracks. Consider, for example, a scenario where a post-processing apparatus (e.g., a smart phone or workstation) obtains footage from an action camera. In some cases, the transferred footage may be obtained for post-processing; in other cases, the transfer may occur via a streaming connection. In one exemplary embodiment, the video and corresponding margin tracks are obtained separately (see e.g., FIGS. 8A and 8B above); for example, a "ready-to-share" video may be transferred shortly after capture; later, when the user has more time to edit/curate their footage, they may review the corresponding margin tracks to recover/modify their existing footage. In other embodiments, the video and corresponding margin tracks may be obtained as a common file structure (see e.g., FIG. 8C above). For instance, a user may retrieve archival footage (e.g., which may include both the video and its margin tracks) for post-processing.

As previously alluded to, the video and/or margin tracks may include metadata that identifies the relative stabilization/rectification of the margin tracks. In some situations, errors in stabilization may be flagged for more processing intensive treatment. Such techniques are described within co-owned U.S. patent application Ser. No. 17/449,713 entitled "METHODS AND APPARATUS FOR RE-STABILIZING VIDEO IN POST-PROCESSING" filed Oct. 1, 2021, previously incorporated herein by reference in its entirety. As a related improvement, errors in rectification may also be flagged for similar treatment; for example, in-camera stabilization errors may result in faulty lens correction. In alternative implementations, faulty lens corrections may be identified by errant stabilization, etc. Additionally, some variants may include original telemetry data corresponding to the device orientation and/or its relative image orientation.

In one embodiment, the tasks are configured to determine a new view for various frames of the video (e.g., based on telemetry data, user input, or other post-processing adjustment). In one exemplary embodiment, the video frames and/or their corresponding margins are rectified (or re-rectified) for the new view. In some such embodiments, the video frames and/or margin may also be stabilized/re-stabilized.

As but one such illustrative usage scenario, in-camera stabilization may have over/under smoothed camera motion; users may wish to adjust the previously stabilized footage to provide more/less subject motion and/or background motion. As another example, in-camera stabilization may have mis-stabilized footage due to real-time processing limitations. In still other applications, the camera may have not had telemetry data, or only partial telemetry data; later, device orientation and/or image orientation may be re-determined in post-capture by the sink device using image analysis techniques.

A practical consequence of re-stabilization is that the footage must be re-rectified for a different lens angle based on the lens polynomial; for example, a cut-out at a first angle that is re-positioned to a second angle may need re-rectification of the re-used portions of the cut-out, as well as the newly added portions taken from the stabilization margin. In some embodiments, the re-rectification may be based on the telemetry data and the lens polynomial (according to the point-by-point mapping techniques described above). In other embodiments, rectification may be based on user defined parameters; for example, a user may identify a subject-of-interest (or a background perspective) and the lens may be rectified according to general heuristics (e.g., straightening lines that appear to be consistently distorted, etc.) Such implementations may be useful where telemetry data (and/or lens polynomial information) is not available.

As previously noted, rectification and stabilization are shown in one order, but alternative orders may be substituted with equal success. Notably, re-rectification of previously stabilized footage may change the apparent orientation of the image; thus, re-rectified footage (of previously stabilized footage) may need to be re-stabilized.

In one exemplary embodiment, the rectified video frames and/or margin are stitched together. Notably, the codec pipeline is lossy and may introduce visual artifacts at discontinuities. For instance, the boundary of the video frames may imperfectly correspond to their margin tracks. Consequently, the re-rectified/re-stabilized video frames may introduce image artifacts at the border of the previous cutout and the newly added portions. To minimize such artifacts, additional stitching, smoothing, dithering, and/or blending may be performed before encoding or subsequent presentation and/or encoding.

Additional Configuration Considerations

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein, the term "computer program" or "software" is meant to include any sequence of human or machine cognizable steps which perform a function. Such program may be rendered in virtually any programming language or environment including, for example, Python, JavaScript, Java, C#/C++, C, Go/Golang, R, Swift, PHP, Dart, Kotlin, MATLAB, Perl, Ruby, Rust, Scala, and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

As used herein, the terms "camera" or "image capture device" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A post-processing apparatus, comprising:
a processor subsystem; and
a non-transitory computer-readable medium that stores instructions which when executed by the processor subsystem, causes the post-processing apparatus to:
obtain a video comprising previously stabilized rectilinear image data according to an originally captured view;
obtain a margin track that corresponds to the previously stabilized rectilinear image data;
obtain telemetry data and a lens characteristic;

determine a new view based on the previously stabilized rectilinear image data and at least one of the margin track, the telemetry data, and the lens characteristic;

correct a first portion of the previously stabilized rectilinear image data and a second portion of the margin track based on the lens characteristic;

stabilize the first portion of the previously stabilized rectilinear image data and the second portion of the margin track based on the telemetry data; and stitch the first portion and the second portion into a video frame.

2. The post-processing apparatus of claim 1, further comprising a codec that is configured to approximate image motion based on straight-line motion vectors and address image data based on row and column addressing; and where the instructions are further configured to cause the post-processing apparatus to encode the video frame into a re-framed rectilinear stabilized video.

3. The post-processing apparatus of claim 2, further comprising a display, and where the instructions, when executed by the processor subsystem, further causes the post-processing apparatus to display the re-framed rectilinear stabilized video.

4. The post-processing apparatus of claim 2, further comprising a network interface, and where the instructions, when executed by the processor subsystem, further causes the post-processing apparatus to transfer the re-framed rectilinear stabilized video to another device for display.

5. The post-processing apparatus of claim 1, further comprising a network interface, and where the instructions, when executed by the processor subsystem, further causes the post-processing apparatus to obtain the previously stabilized rectilinear image data from another device that is streaming the video.

6. The post-processing apparatus of claim 1, further comprising a user interface that enables a user to identify a subject-of-interest within a frame of the video; and where the instructions, when executed by the processor subsystem, further causes the post-processing apparatus to determine the new view based on the subject-of-interest.

7. A method, comprising:
obtaining a video comprising previously stabilized rectilinear image data according to an originally captured view;

obtaining a margin track that corresponds to the previously stabilized rectilinear image data;

obtaining telemetry data and a lens characteristic;

determining a new view based on the previously stabilized rectilinear image data and at least one of the margin track, the telemetry data, and the lens characteristic;

correcting a first portion of the previously stabilized rectilinear image data and a second portion of the margin track based on the lens characteristic;

stabilizing the first portion of the previously stabilized rectilinear image data and the second portion of the margin track based on the telemetry data; and stitching the first portion and the second portion into a video frame.

8. The method of claim 7, further encoding the video frame into a re-framed rectilinear stabilized video.

9. The method of claim 8, further comprising displaying the re-framed rectilinear stabilized video.

10. The method of claim 8, further comprising transferring the re-framed rectilinear stabilized video to another device for display.

11. The method of claim 7, further comprising obtaining the previously stabilized rectilinear image data from another device that is streaming the video.

12. The method of claim 7, further comprising identifying a subject-of-interest within a frame of the video and determining the new view based on the subject-of-interest.

13. A method, comprising:
obtaining a video, a margin track, a telemetry track, and a lens characteristic that corresponds to the video;

determining a view based on the video and at least one of the margin track, the telemetry track, and the lens characteristic;

correcting a first frame of the video and a margin portion of the margin track based on the lens characteristic;

stabilizing the first frame of the video and the margin portion of the margin track based on the telemetry track; and stitching the first frame and the margin portion into a new video frame.

14. The method of claim 13, where the video comprises a previously stabilized video.

15. The method of claim 13, where the video, the margin track, and the telemetry track, are obtained from a shared data structure.

16. The method of claim 13, where at least one of the video, the margin track, and the telemetry track, are obtained from different data structures.

17. The method of claim 13, where the video, the margin track, and the telemetry track, are obtained from a ready-to-share data stream.

18. The method of claim 13, where the view is based on user input.

19. The method of claim 13, where the view is based on the telemetry track.

20. The method of claim 19, where the telemetry track comprises a flag that identifies an error in stabilization.

* * * * *